United States Patent [19]

Gauer

[11] Patent Number: 5,297,048
[45] Date of Patent: Mar. 22, 1994

[54] ANGULAR POSITION EXTRAPOLATION OF A ROTATING CRANKSHAFT CORRECTED FOR CRANKSHAFT ACCELERATION AND DECELERATION

[75] Inventor: Richard J. Gauer, Tempe, Ariz.

[73] Assignee: Automotive Integrated Electronics Co., Inc., Phoenix, Ariz.

[21] Appl. No.: 948,165

[22] Filed: Sep. 21, 1992

[51] Int. Cl.⁵ ............................................. F02M 7/00
[52] U.S. Cl. ........................... 364/431.12; 364/431.04; 123/416
[58] Field of Search ........................ 364/431.04, 431.11, 364/431.12, 550, 565, 566, 577; 123/416, 417, 418, 478, 480, 436, 486, 487, 488

[56] References Cited

U.S. PATENT DOCUMENTS

| | | |
|---|---|---|
| 3,767,902 | 10/1973 | Estes et al. . |
| 3,935,846 | 2/1976 | Zelenka . |
| 3,946,709 | 3/1976 | Monpetit . |
| 3,998,193 | 12/1976 | Ives et al. . |
| 4,081,995 | 4/1978 | Griffith et al. . |
| 4,119,069 | 10/1978 | Perrin . |
| 4,250,858 | 2/1981 | Jeenicke et al. . |
| 4,273,089 | 6/1981 | Maier . |
| 4,296,471 | 10/1981 | Goux . |
| 4,414,946 | 11/1983 | Däumer et al. . |
| 4,434,470 | 2/1984 | Thomas et al. . |
| 4,509,484 | 4/1985 | Gertiser ........................ 123/436 X |
| 4,814,704 | 3/1989 | Zerrien et al. . |
| 4,977,508 | 12/1990 | Tanaka et al. ................... 123/436 X |
| 5,035,220 | 7/1991 | Uchinami et al. ................ 123/436 |
| 5,041,979 | 8/1991 | Hirka et al. . |
| 5,050,080 | 9/1991 | Abe .............................. 364/431.12 |
| 5,200,900 | 4/1993 | Adrain et al. .................. 364/431.12 |
| 5,231,966 | 8/1993 | Yoshida et al. ................. 123/436 |

*Primary Examiner*—Jack B. Harvey
*Assistant Examiner*—Edward J. Pipala

[57] ABSTRACT

An integrated circuit for indicating the angular position of a rotating crankshaft corrected for crankshaft acceleration and deceleration. The circuit counts crankshaft markers spaced at equal angles about the crankshaft to produce a coarse grain position of the crankshaft. The circuit computes the time for the crankshaft to rotate to a series of incremental positions between contiguous markers and extrapolates a plurality of fine grain incremental positions of the crankshaft as a function of prior changes in velocity of the crankshaft. The coarse grain position is added to a fine grain position to produce a real time position of the crankshaft. A digital position bus communicates the real time crankshaft position. The circuit also computes both the velocity of the crankshaft after detecting each marker and the average acceleration of the crankshaft between contiguous markers for output over a digital velocity bus and a digital acceleration bus.

24 Claims, 16 Drawing Sheets

— ENGINE CONTROL INTEGRATED CIRCUIT.

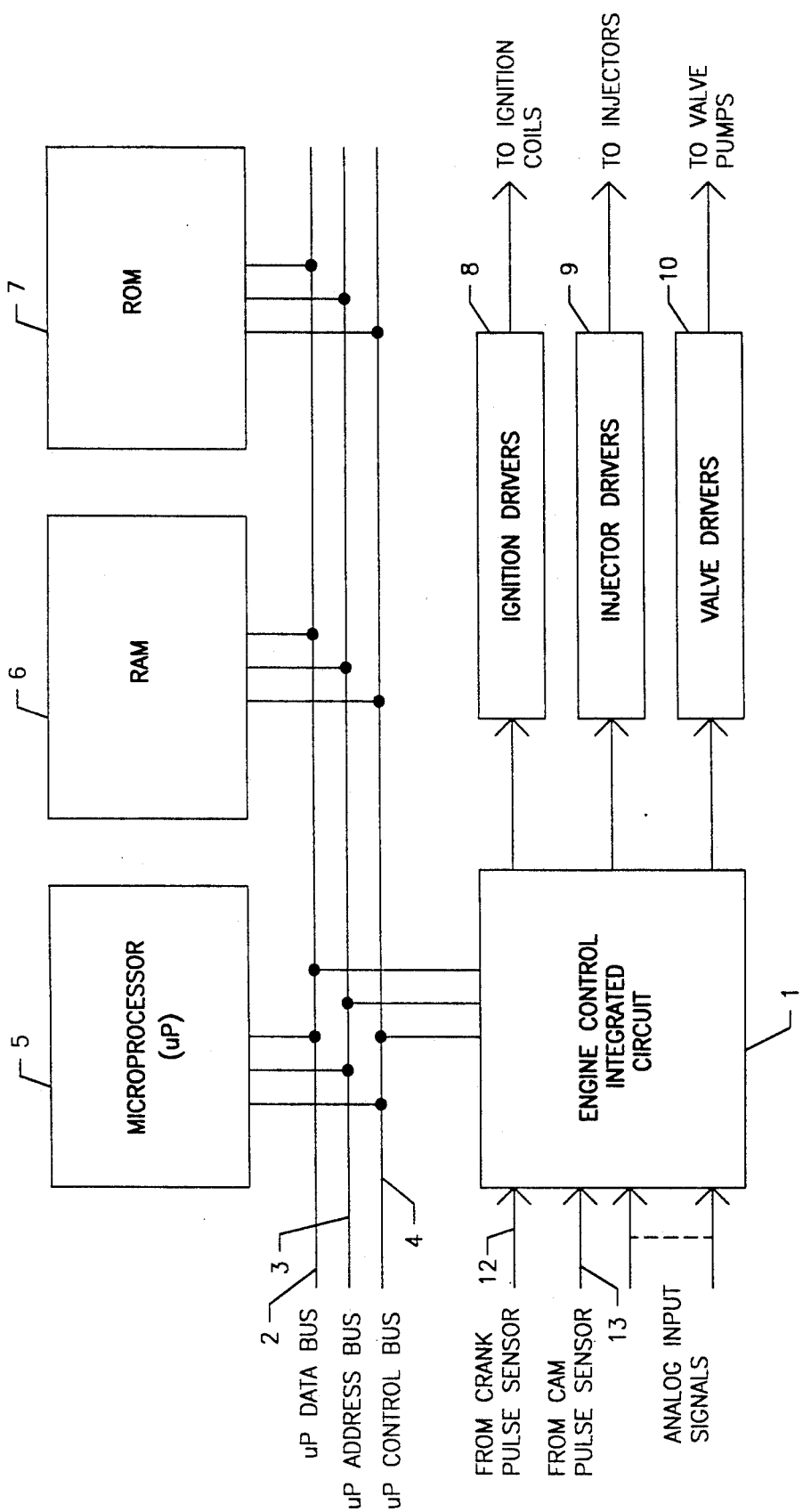
FIGURE 1- BLOCK DIAGRAM OF ENGINE CONTROL UNIT WITH ENGINE CONTROL INTEGRATED CIRCUIT.

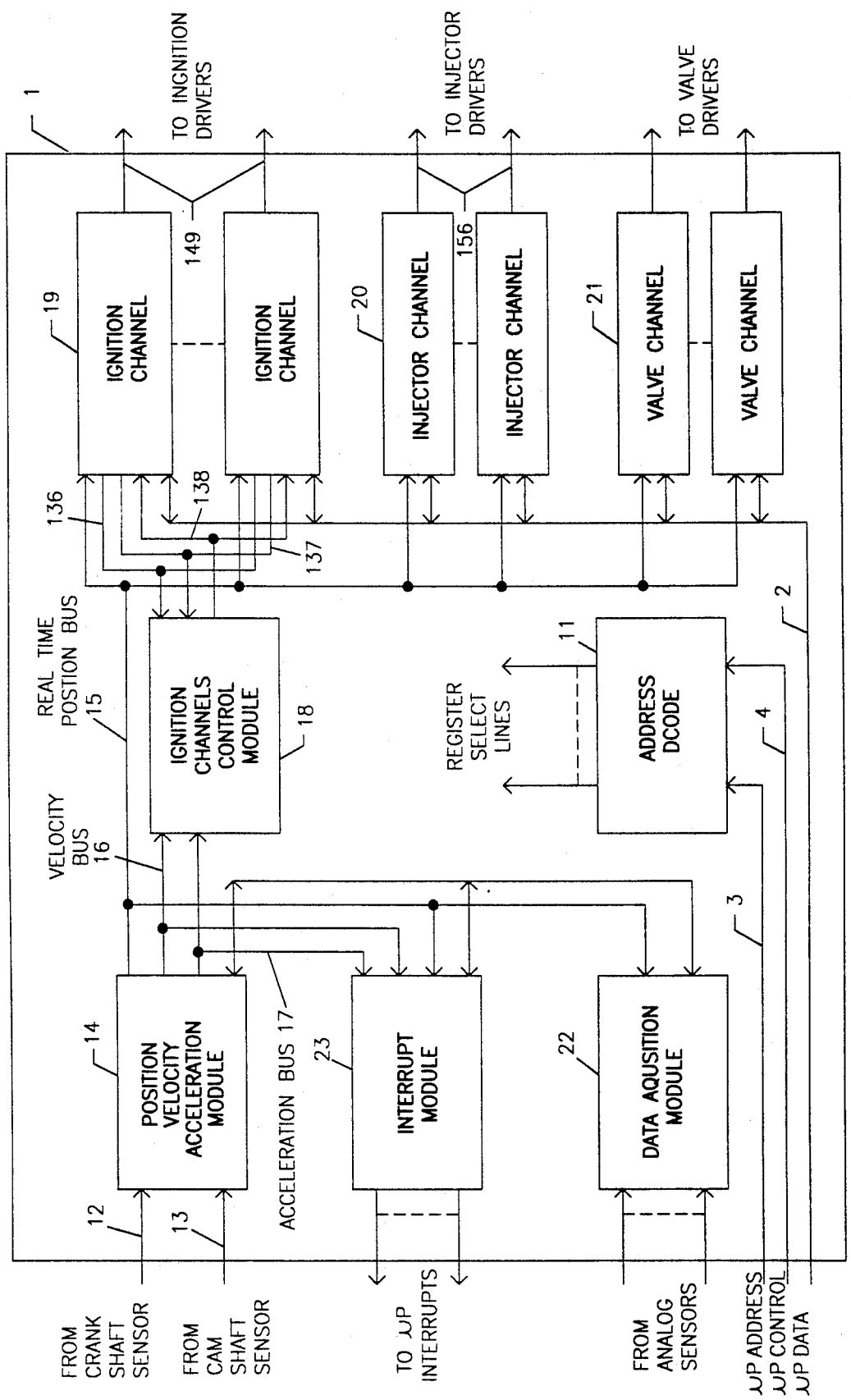
FIGURE 2- ENGINE CONTROL INTEGRATED CIRCUIT.

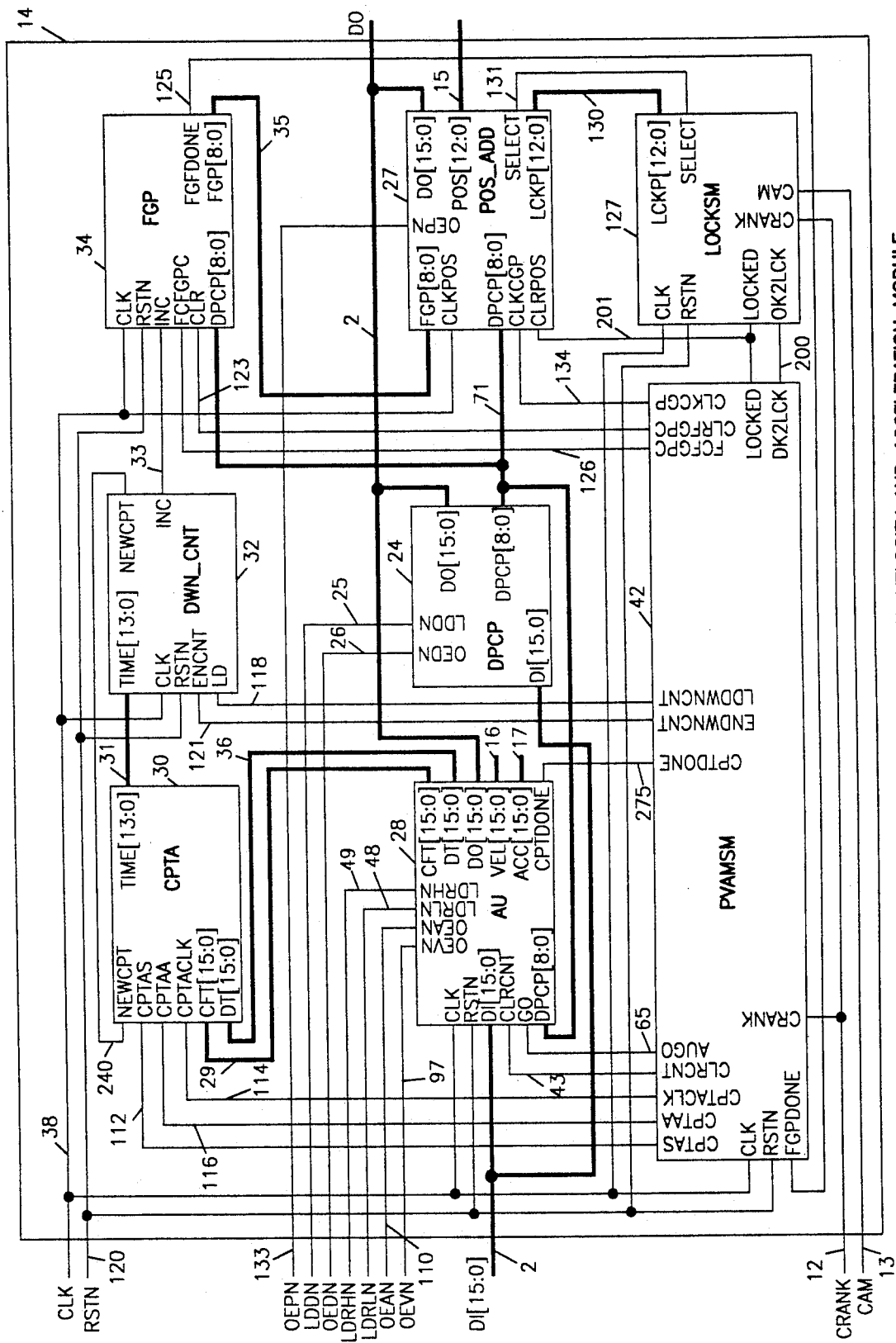
FIGURE 3—BLOCK DIAGRAM OF THE POSITION, VELOCITY AND ACCELERATION MODULE.

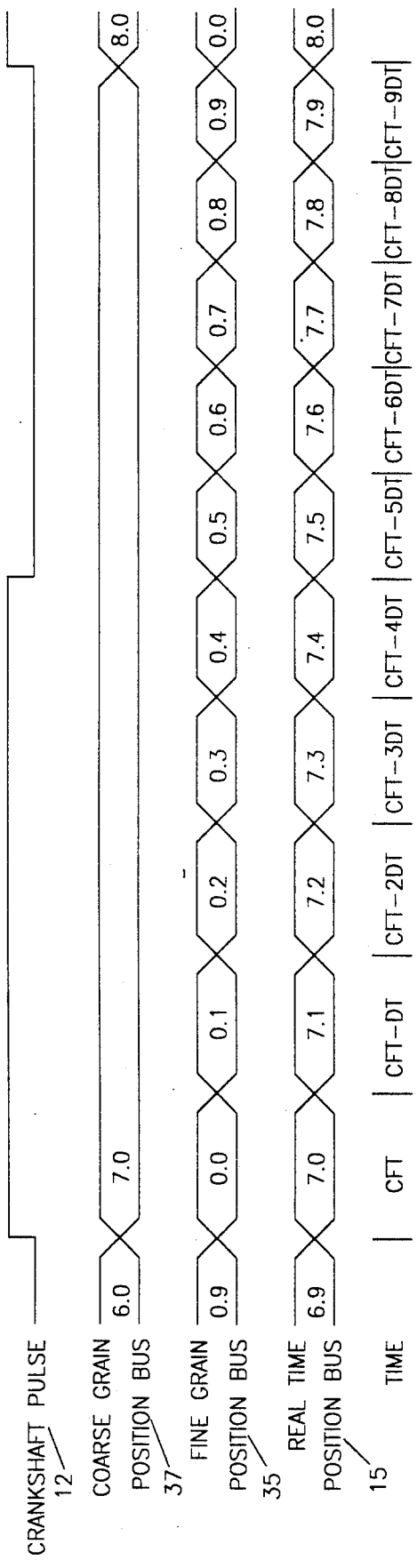
FIGURE 4 – REAL TIME POSITION BUS WAVEFORMS.
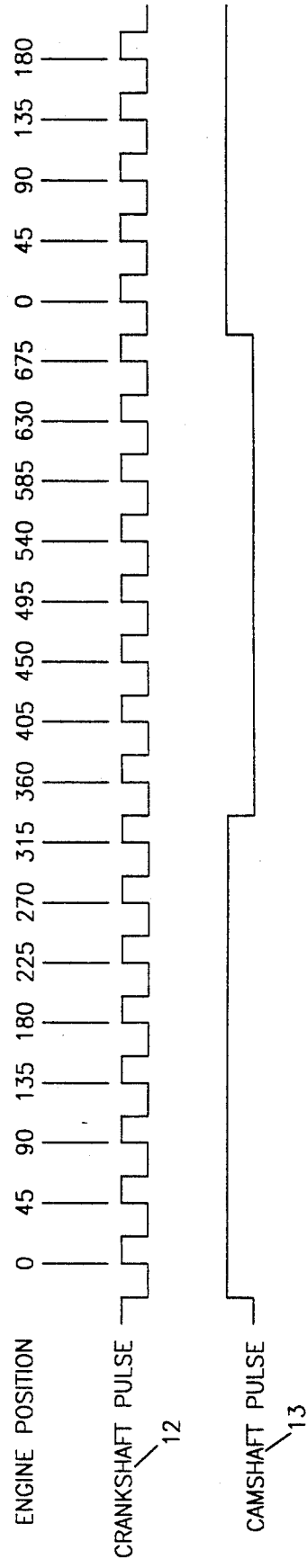
FIGURE 5 – CRANK AND CAM SHAFT SIGNALS RELATIVE TO ENGINE POSITION.

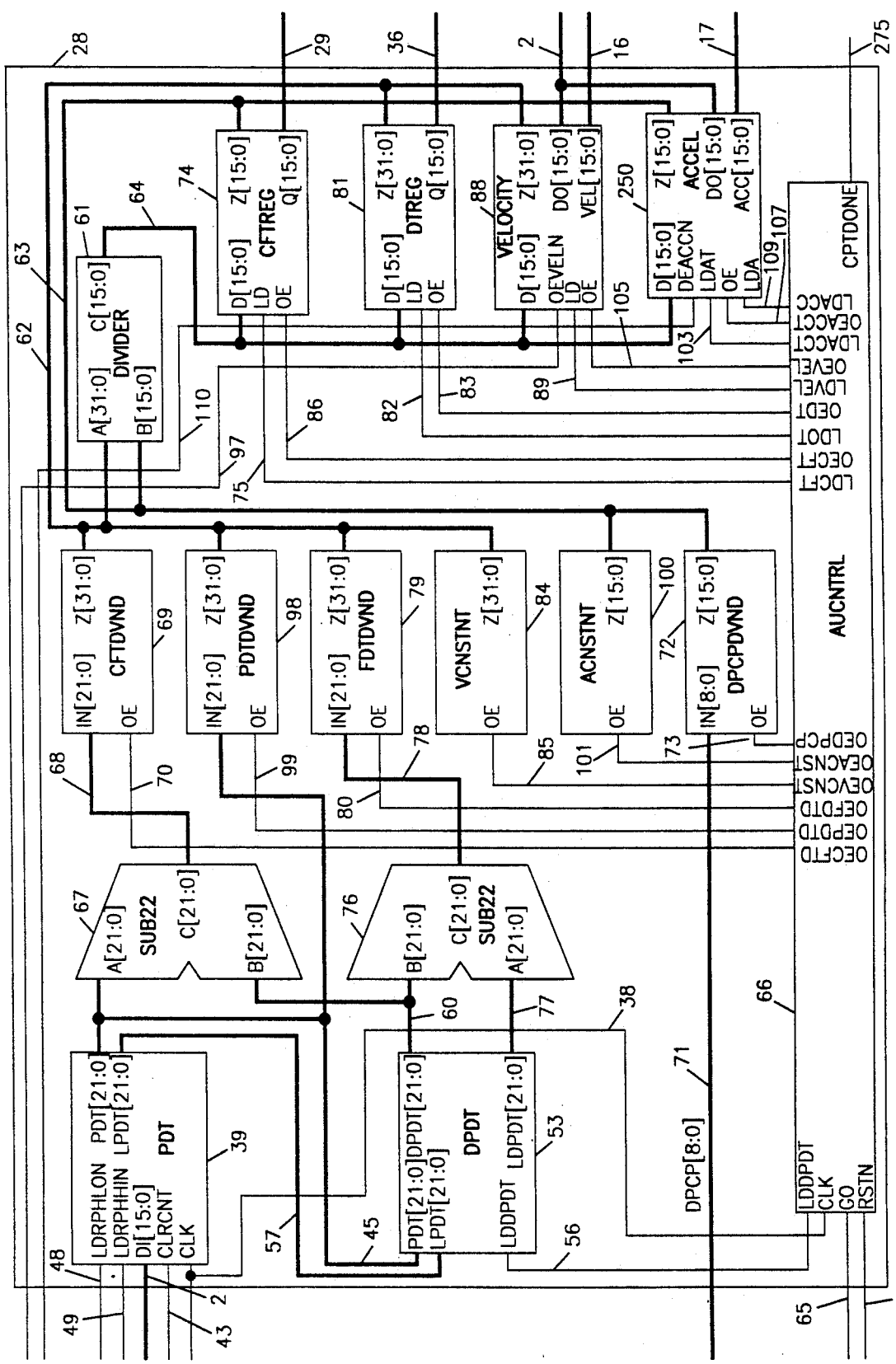
FIGURE 6 – ARITHMETIC UNIT.

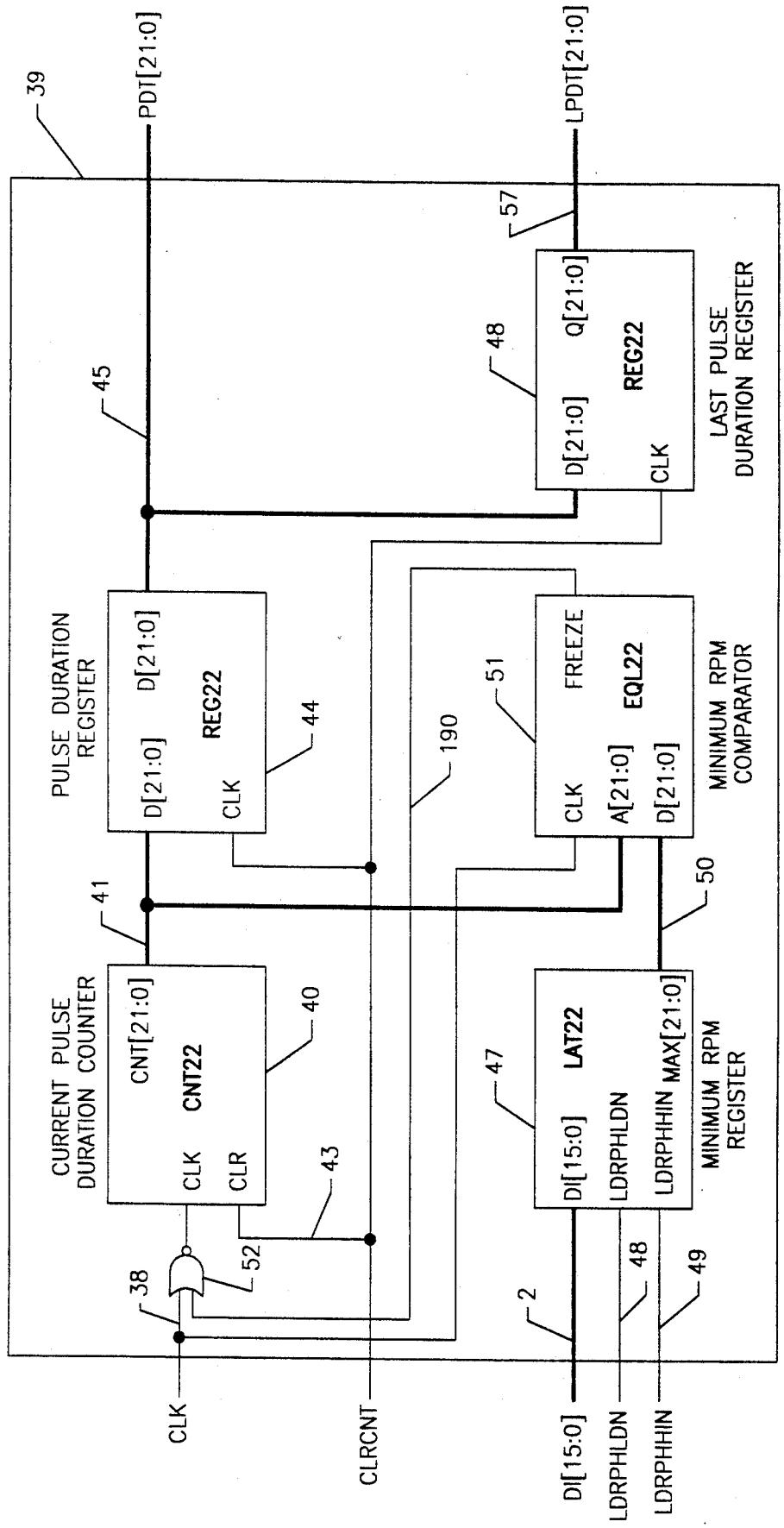
FIGURE 7 — PULSE DURATION TIMER.

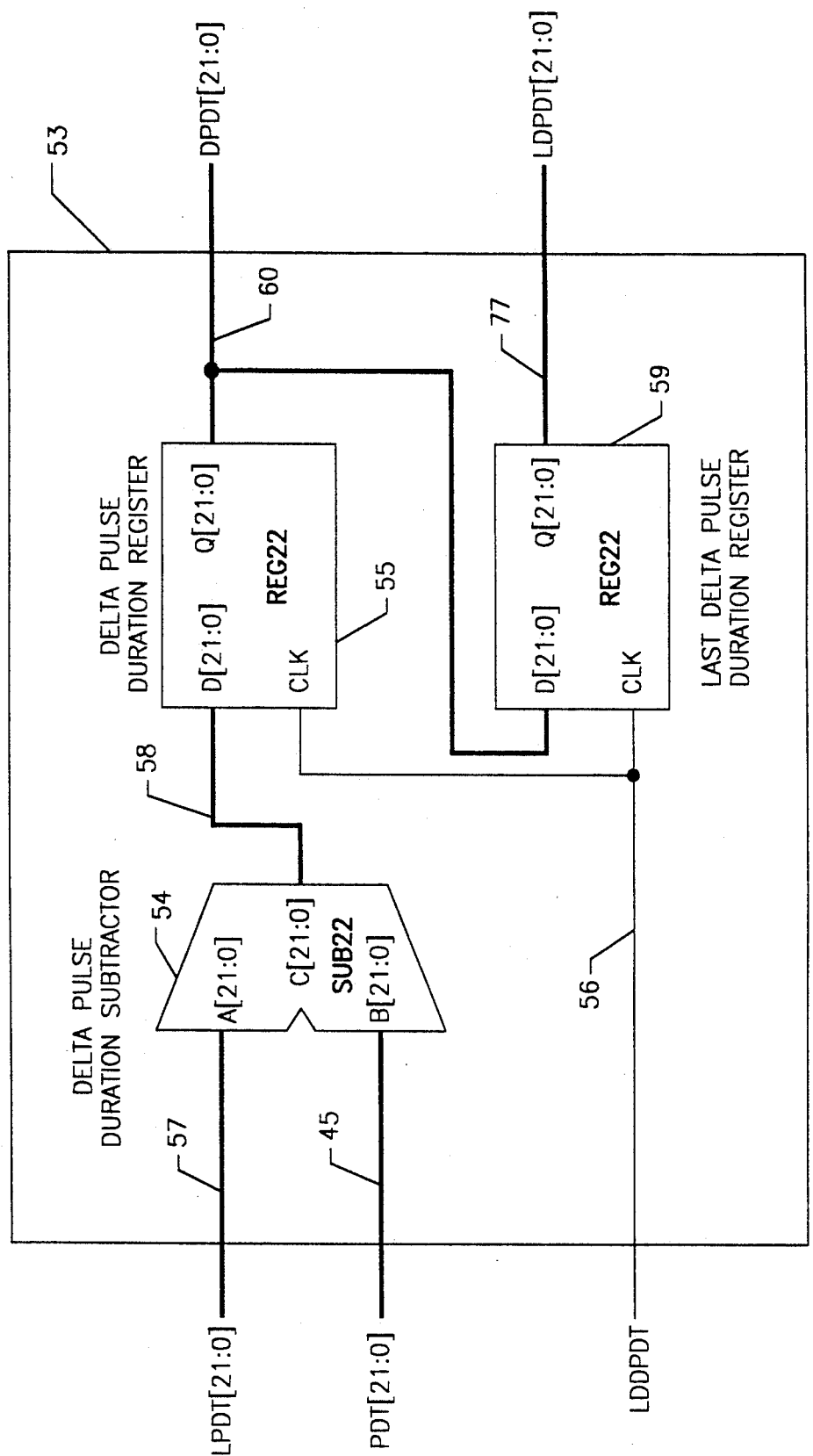
FIGURE 8 — DELTA PULSE DURATION TIMER.

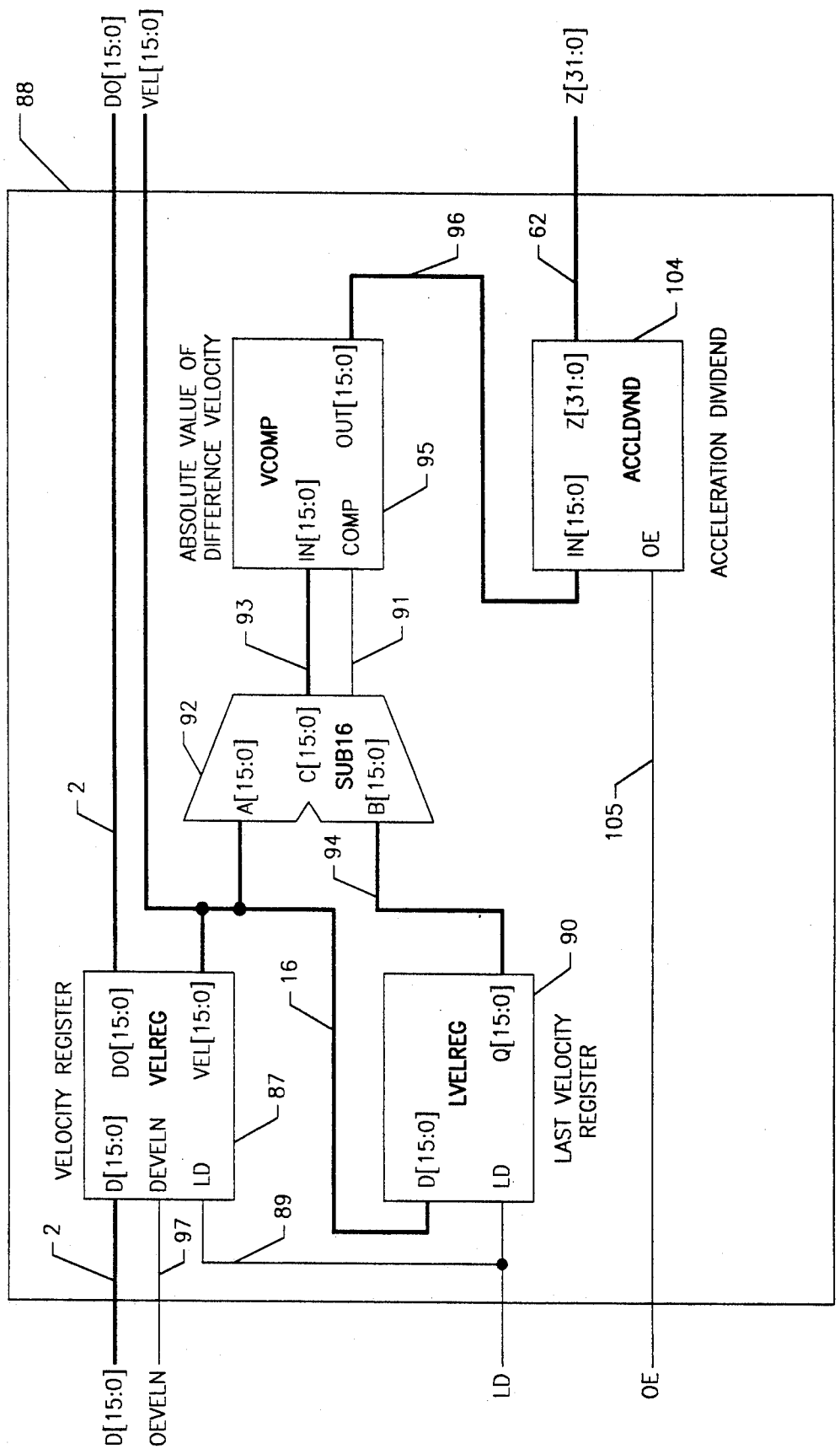
FIGURE 9 - VELOCITY LOGIC.

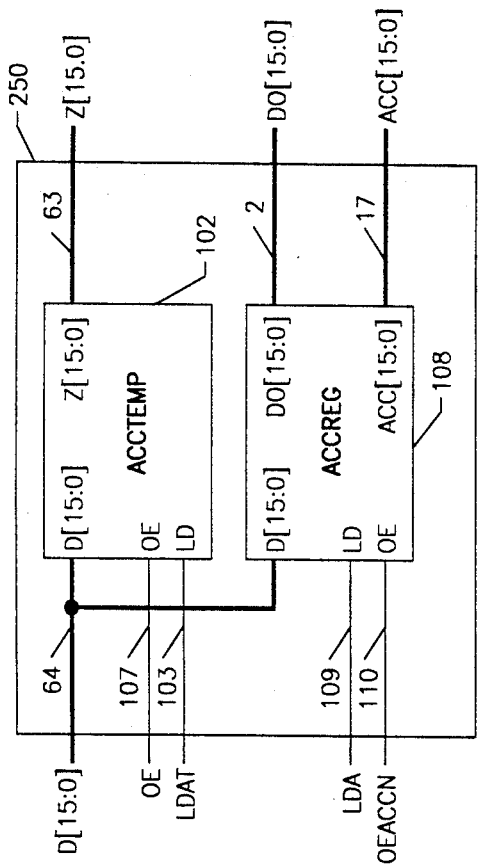
FIGURE 10 — ACCELERATION LOGIC.
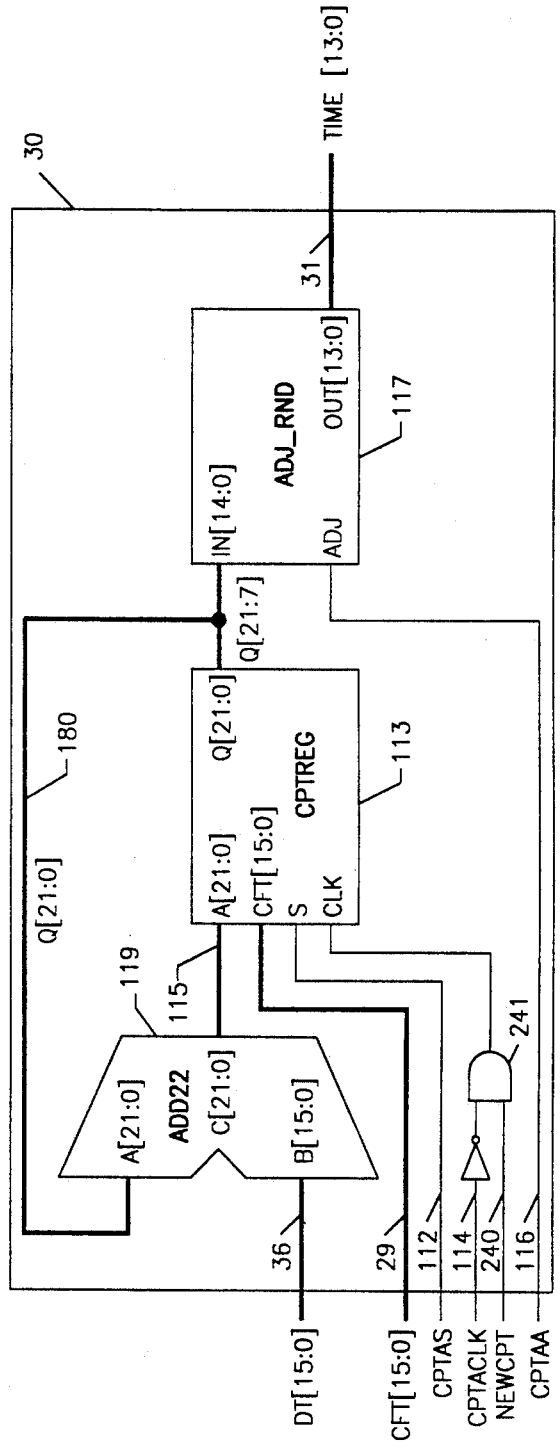
FIGURE 11 — CLOCKS PER TICK ACCUMULATOR.

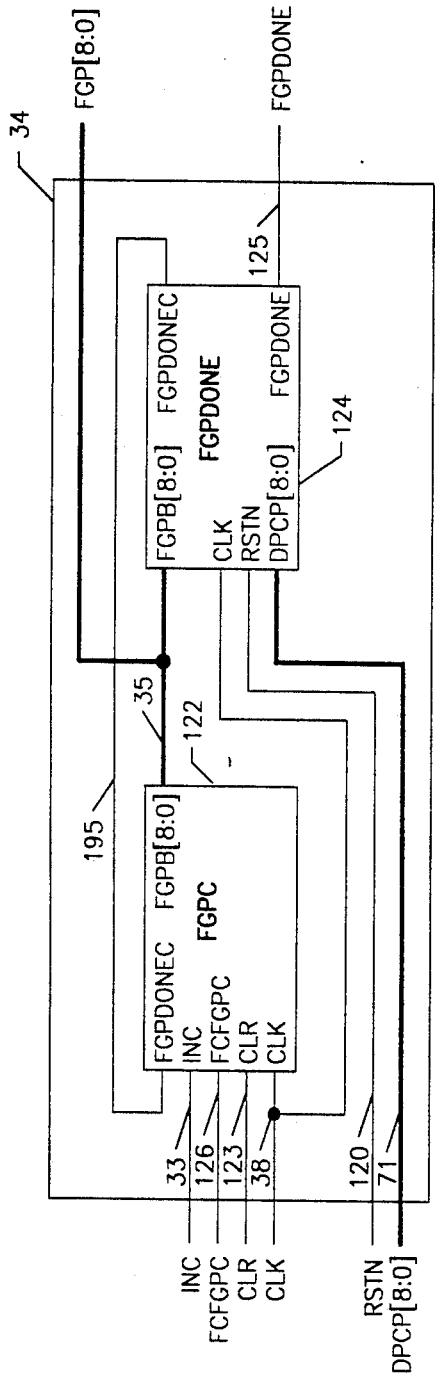
FIGURE 12 - FINE GRAIN POSITION LOGIC.
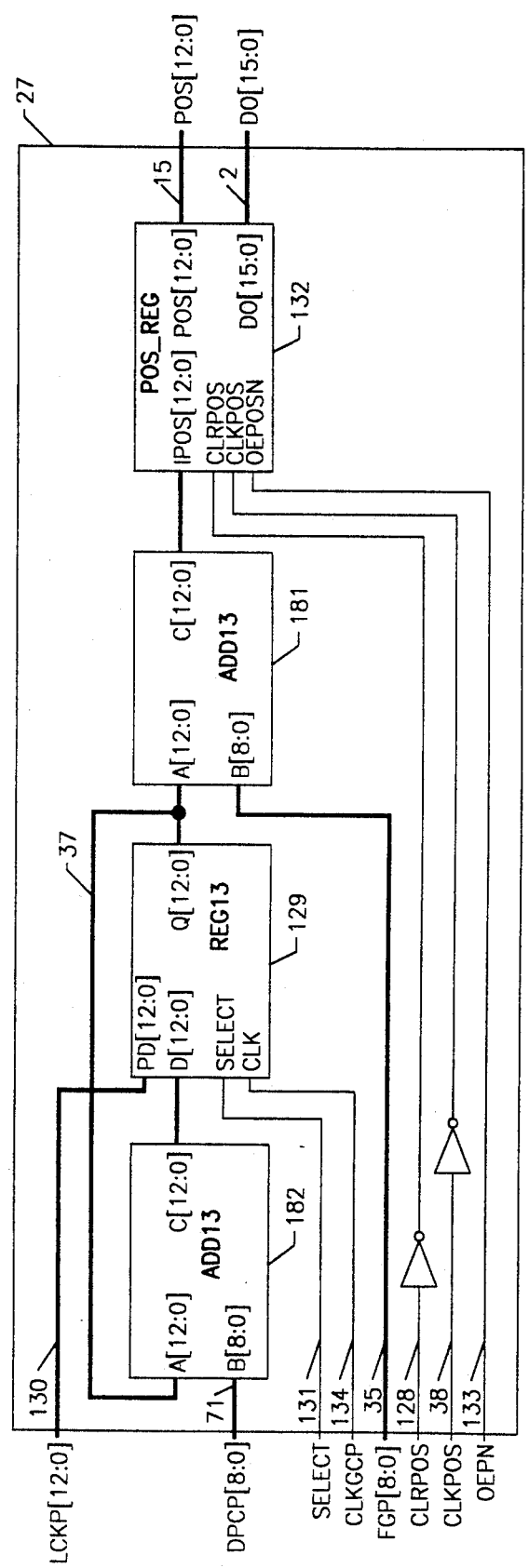
FIGURE 13 - POSITION ADDER LOGIC.

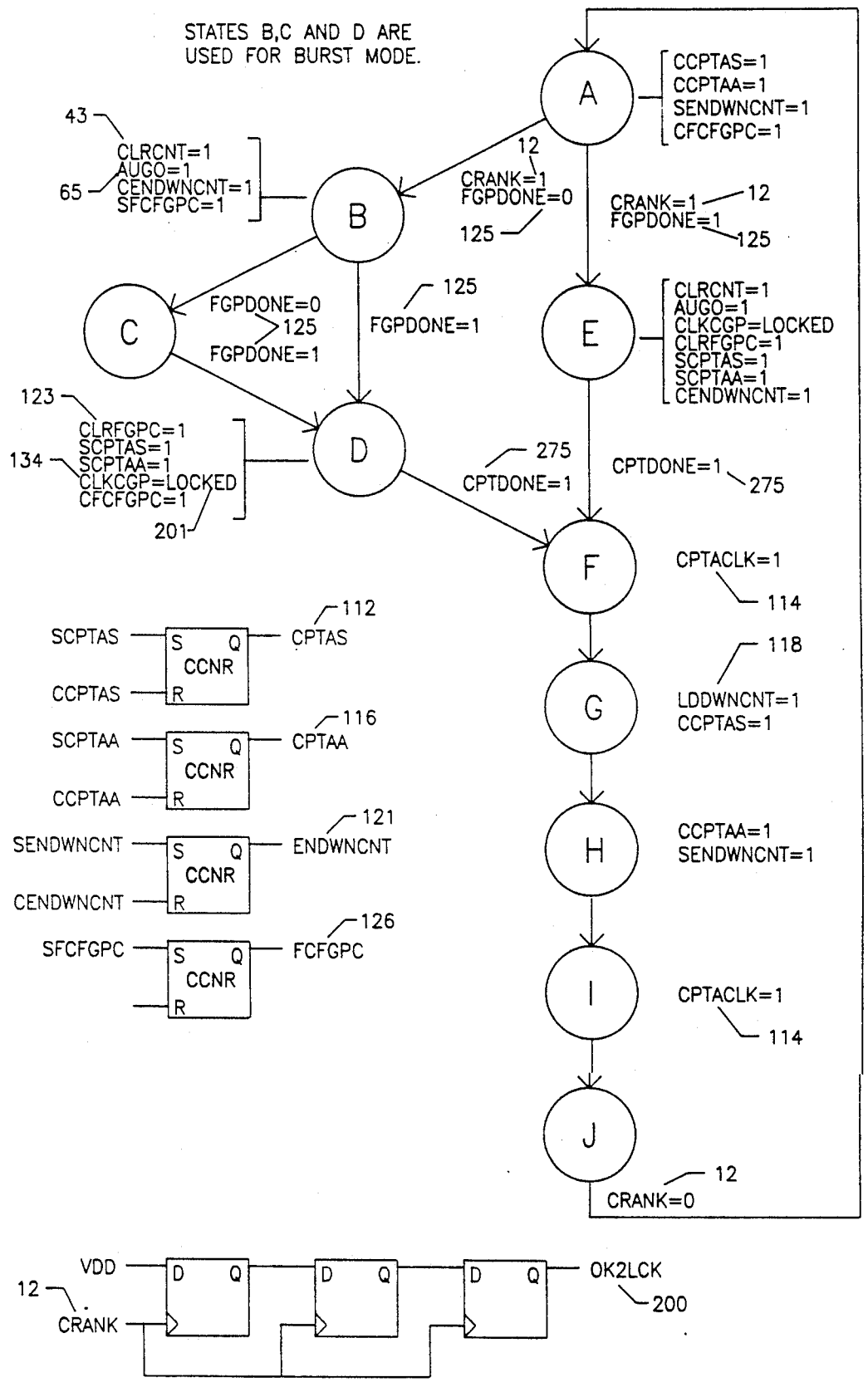
FIGURE 14 — PVAM CONTROLLER STATE DIAGRAM.

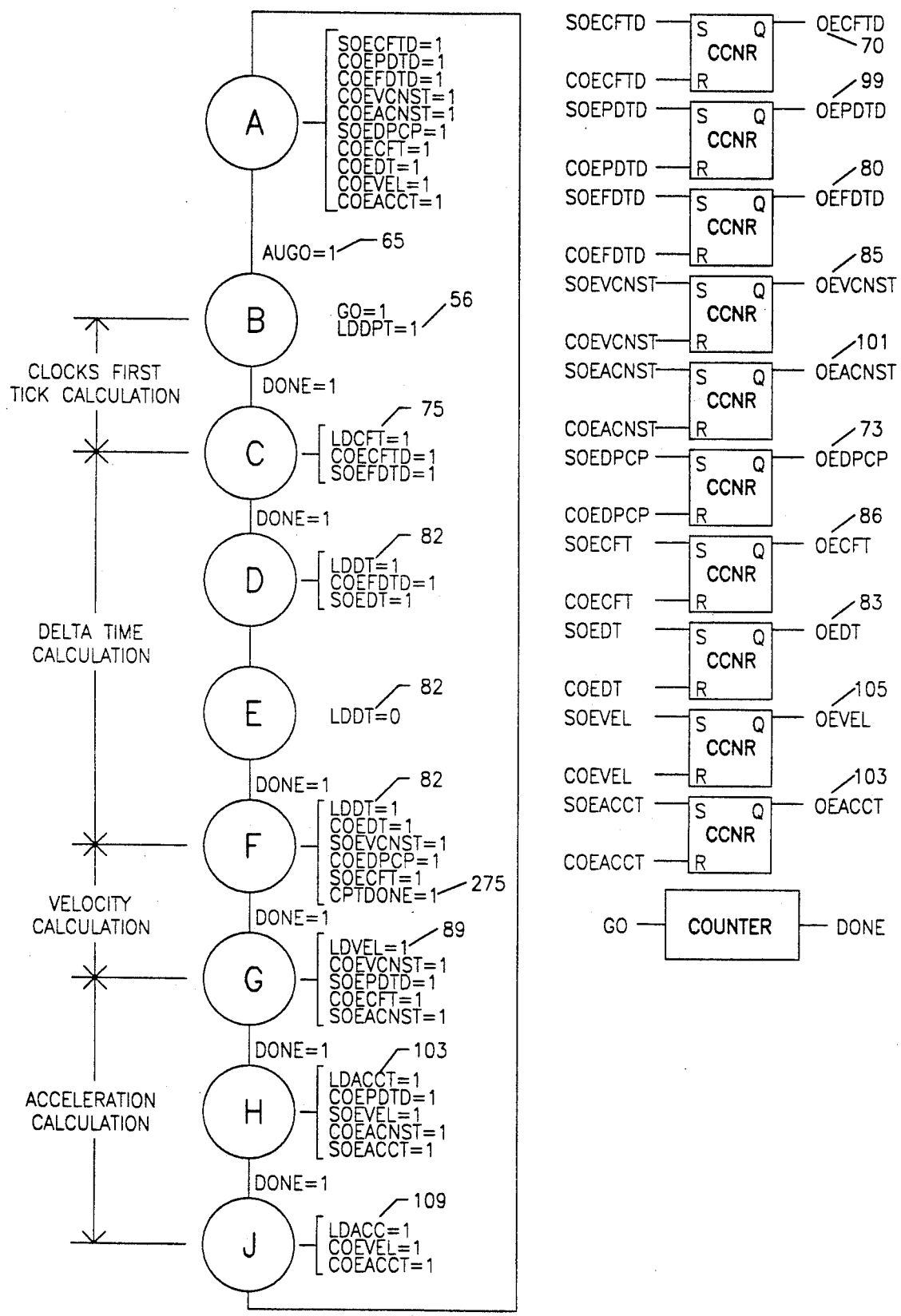
FIGURE 15 – ARITHMETRIC UNIT CONTROLLER STATE DIAGRAM.

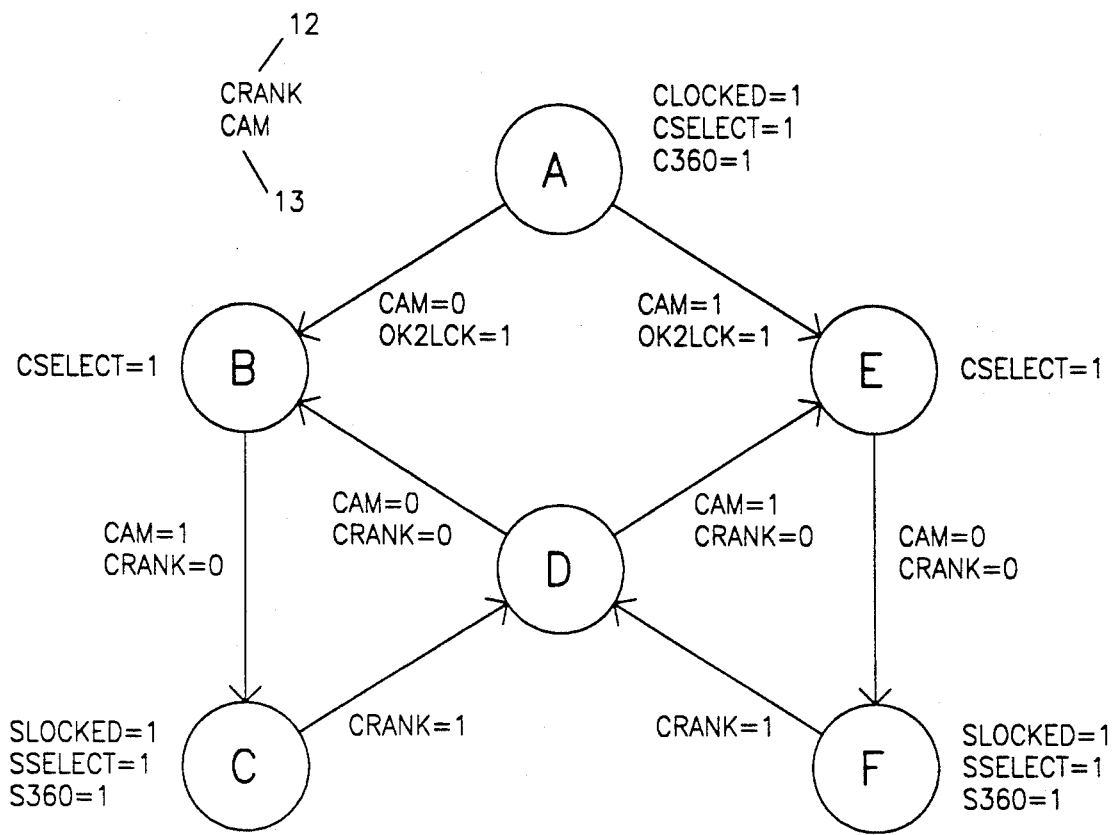
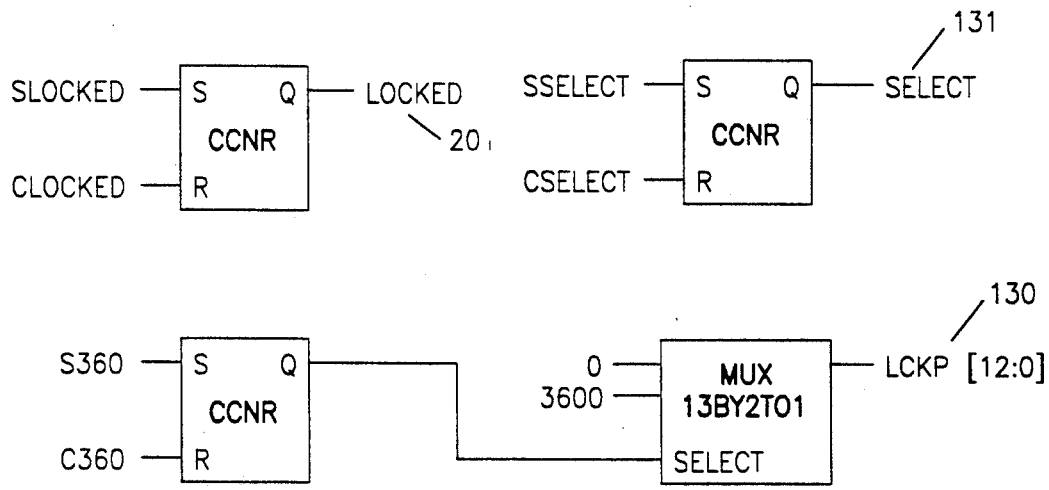
FIGURE 16 - LOCK CONTROLLER STATE DIAGRAM.

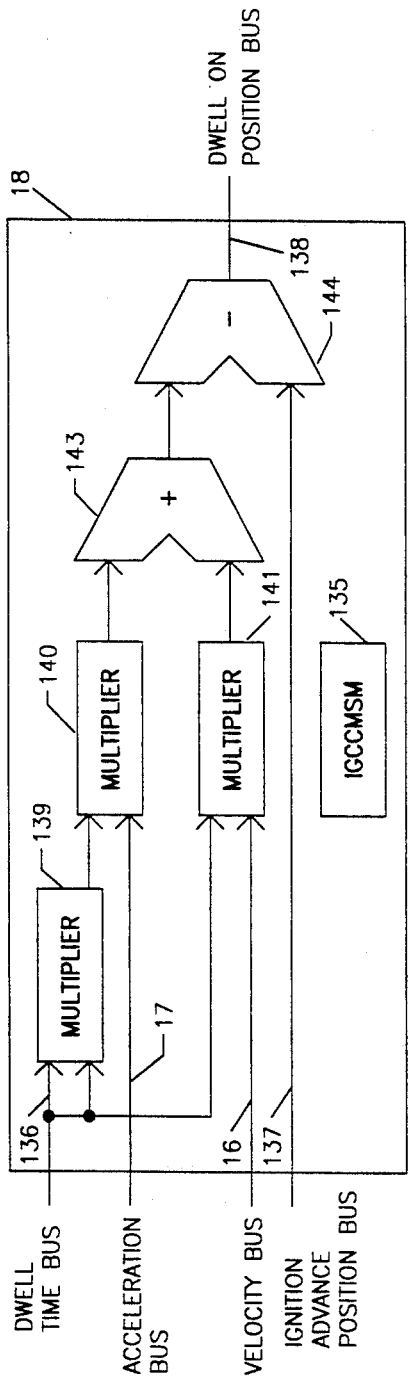
FIGURE 17 - IGNITION CHANNELS CONTROL MODULE.
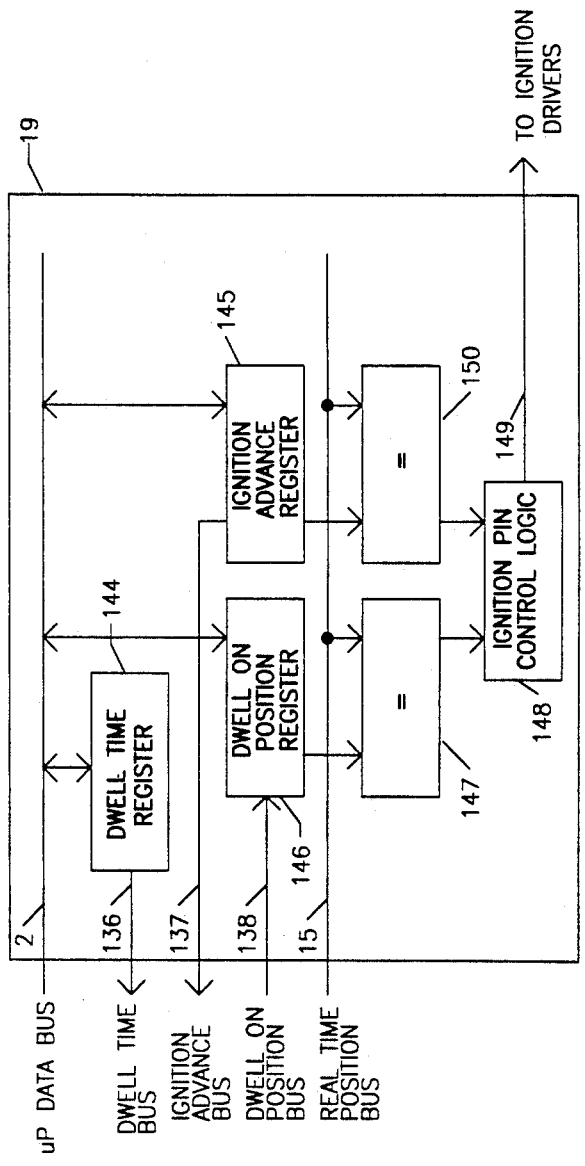
FIGURE 18 - IGNITION CHANNEL.

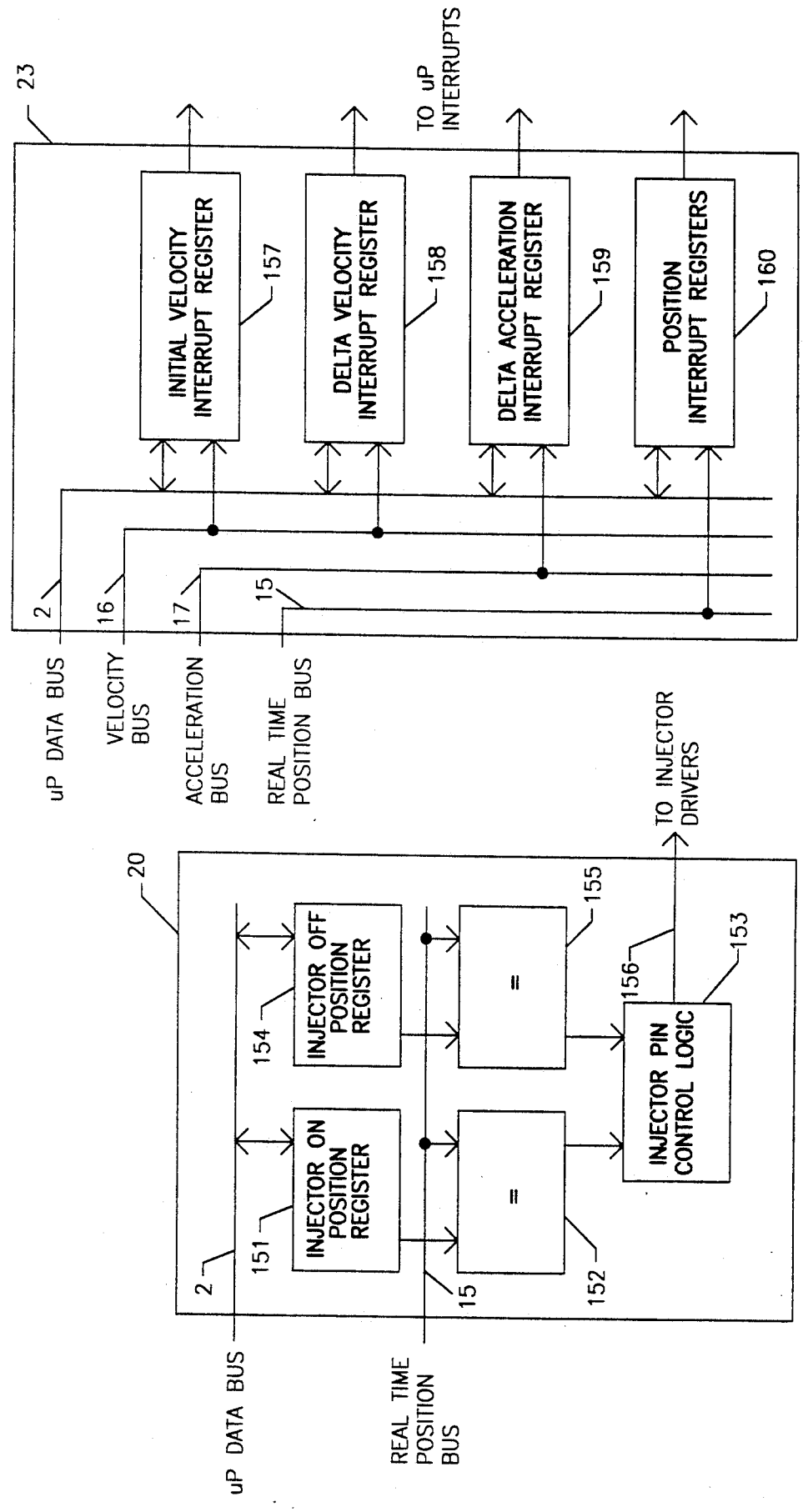
FIGURE 20 - INTERRUPT MODLUE.
FIGURE 19 - INJECTOR CHANNEL MODULE.

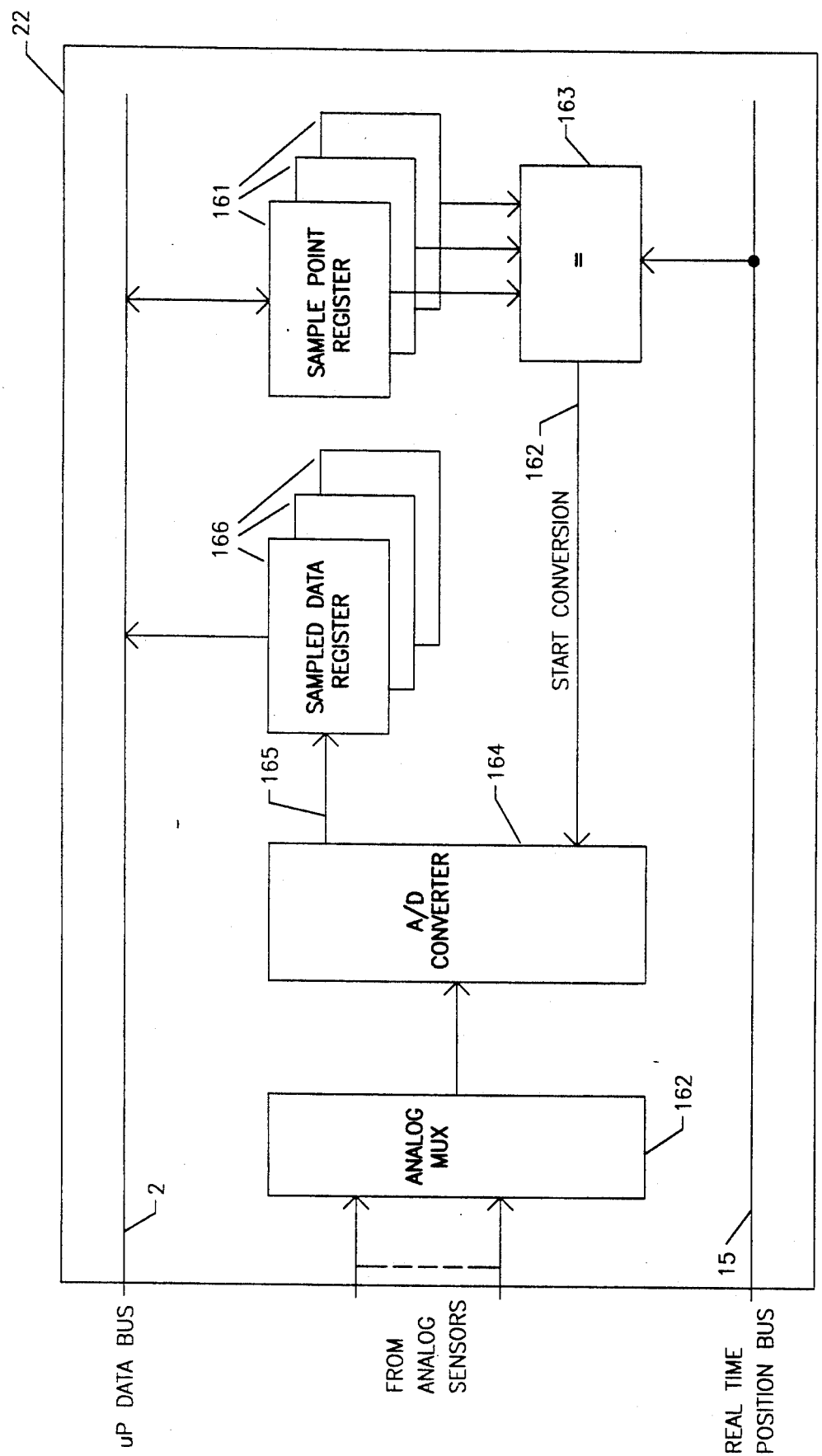
FIGURE 21 – DATA AQUISITION MODULE.

ANGULAR POSITION EXTRAPOLATION OF A ROTATING CRANKSHAFT CORRECTED FOR CRANKSHAFT ACCELERATION AND DECELERATION

TECHNICAL FIELD

This invention relates to an integrated circuit providing real time extrapolated or predicted position, velocity and acceleration of a rotating crankshaft of an internal combustion engine for ignition timing, fuel injection control and variable valve timing, wherein the predicted crankshaft position is corrected for acceleration and deceleration of the engine.

BACKGROUND OF THE INVENTION

Modern engine control systems use a microprocessor to monitor critical engine parameters, such as engine speed and load, to achieve precise control of ignition timing. In known ignition timing control systems, a read only memory (ROM) stores a map or table of spark advance firing angles as a function of engine speeds and loads. After reading the current engine speed and load, the microprocessor performs a table lookup to obtain the ignition advance angle at which a spark plug should be fired. The microprocessor must also track crankshaft angular position so that spark firing can be triggered at the crankshaft angle corresponding to the spark advance angle determined by the table lookup.

To track a rotating crankshaft, it is known to monitor a disk secured to the crankshaft where the disk includes a number of teeth or markers spaced at equal angles around the periphery of the disk. Counting markers provides a coarse measure of the angular position of the crankshaft which, in turn, allows spark firing at the proper angle in the engine cycle. It is also known to provide higher resolution or fine crankshaft position signals between two adjacent teeth by extrapolating or predicting a plurality of positions based on the elapsed time of the immediately preceding marker interval.

If the crankshaft rotated at a constant velocity, predicting the fine angular increments during each subsequent marker interval would be a straightforward linear extrapolation from the previous marker interval. However, the crankshaft of a running engine experiences transient accelerations and decelerations which distort the crankshaft positions predicted using a linear extrapolation system. U.S. Pat. No. 4,814,704 recognizes the problem of predicting crankshaft position in the presence of these transient variations in crankshaft speed but simply resynchronizes upon arrival of a new crankshaft marker, thereby correcting the error which was introduced during its linear extrapolation.

U.S. Pat. No. 4,081,995 discloses an apparatus and method for extrapolating the angular position of a rotating crankshaft using a nonlinear or exponential down counter to approximate acceleration conditions. Using the exponential down counter results in reduced extrapolation errors over linear extrapolation techniques; however, significant errors still arise with the position approximation technique described in U.S. Pat. No. 4,081,995.

SUMMARY OF THE INVENTION

In accordance with the present invention, an engine control integrated circuit includes a Position, Velocity and Acceleration Module (PVAM) or circuit which continuously calculates and outputs over a Real Time Position Bus a real time crankshaft position in absolute crankshaft degrees corrected for acceleration and deceleration of the engine. The Position, Velocity and Acceleration Module (PVAM) also outputs over respective buses a velocity digital value and an acceleration digital value for ignition control.

In particular, the Position, Velocity and Acceleration Module (PVAM) tracks crankshaft position by counting equal angularly spaced teeth or markers of a disk attached to the crankshaft for generating a coarse crankshaft position. From the marker just counted until the next marker, defined as an extrapolation marker interval, the PVAM predicts or extrapolates a plurality of angular incremental positions of the crankshaft in tenths of degrees. High speed clock signals are accumulated between the marker just counted and the immediately preceding marker, defined as a first prior marker interval. Clock signals are accumulated also for a marker interval immediately preceding the first prior marker interval, defined as a second prior marker interval. The accumulated clocks in the first and second prior marker intervals represent the time taken for the crankshaft to rotate through contiguous equal crankshaft angles.

To correct for crankshaft acceleration and deceleration, an arithmetic unit of the PVAM computes a time (equivalent to a number of clock signals) for the crankshaft to rotate to a first incremental 0.1° position as a function of both the time of the first prior marker interval and the difference in time between the first and second prior marker intervals. A down counter counts the computed time down to zero and outputs a 0.1° position signal. The arithmetic unit also computes a change in time between each of the incremental positions as a function of the difference in times between both the first and second prior marker intervals and the second prior marker interval and a previous marker interval. After the 0.1° position signal, the computed change in time is added to the time of the first or a previous incremental position to produce the time for the next incremental position.

The time for the next incremental position is then counted down in the down counter to zero. At each zero output of the down counter, a fine grain position counter is incremented by a count representing 0.1°, thereby providing a running total of angular incremental positions between markers. Next, the fine grain position counter is added to the coarse crankshaft position to produce an absolute crankshaft position corrected for acceleration and deceleration of the engine. The next crankshaft marker initiates a new extrapolation interval causing the arithmetic unit to compute revised times for the first 0.1° incremental position and for the change in time between subsequent incremental positions.

Among the objects of the present invention are, therefore, an improved system for extrapolating engine position corrected for acceleration and deceleration of the crankshaft, thereby providing a nonlinear extrapolation system which significantly reduces extrapolation errors over that of the prior art.

Another object is the provision of a real time position bus for communicating the crankshaft position to a microprocessor and to other circuitry of an engine control system.

Another object is the provision of a velocity bus and an acceleration bus for communicating the initial velocity of the crankshaft at the beginning of each marker interval and the average acceleration of the crankshaft over the preceding marker interval to a microprocessor and to other circuitry of an engine control system.

Other objects of the present invention will become apparent from the detailed description to follow taken in conjunction with the accompanying drawings.

BRIEF DESCRIPTION OF THE DRAWINGS

FIG. 1 is a general block diagram of an internal combustion engine control system illustrating a microprocessor interfaced to the engine control integrated circuit of the present invention.

FIG. 2 is a general block diagram of the engine control integrated circuit of the present invention.

FIG. 3 is a schematic diagram of the Position, Velocity and Acceleration Module (PVAM) of the integrated circuit of FIG. 2.

FIG. 4 set of digital waveform signals that make up the Real Time Position Bus.

FIG. 5 is a set of digital waveforms showing the relationship between the crankshaft and camshaft pulses and the absolute engine position.

FIG. 6 is a schematic diagram of the Arithmetic Unit (AU) contained within the PVAM of FIG. 3 for computing position, velocity and acceleration values.

FIG. 7 is a schematic diagram of the Pulse Duration Timer contained within the AU of FIG. 6 for timing the current and previous cranks pulse intervals.

FIG. 8 is a schematic diagram of the Delta Pulse Duration Timer contained within the AU of FIG. 6 for calculating the difference in time between the current and previous crankshaft pulse intervals.

FIG. 9 is a schematic diagram of the Velocity Logic contained within the AU of FIG. 6.

FIG. 10 is a schematic diagram of the Acceleration Logic contained within the AU of FIG. 6.

FIG. 11 is a schematic diagram of the Clocks Per Tick Accumulator contained within the PVAM of FIG. 3.

FIG. 12 is a block diagram of the Fine Grain Position Logic contained within the PVAM of FIG. 3.

FIG. 13 is a block diagram of the Position Adder contained within the PVAM of FIG. 3.

FIG. 14 is a state diagram for the PVAM state machine.

FIG. 15 is a state diagram for the AU state machine.

FIG. 16 is a state diagram for the Lock state machine.

FIG. 17 is a block diagram of the Ignition Channels Control Module of FIG. 2.

FIG. 18 is a schematic diagram of a single Ignition Channel of FIG. 2.

FIG. 19 is a schematic diagram of a single Injector Channel of FIG. 2.

FIG. 20 a schematic diagram of the Interrupt Module of FIG. 2.

FIG. 21 is a schematic diagram of the Data Acquisition Module of FIG. 2.

DETAILED DESCRIPTION OF THE PREFERRED EMBODIMENT

FIG. 1 illustrates a block diagram of an internal combustion engine control system in which a microprocessor (uP) 5 is connected to the engine control integrated circuit 1 of the present invention over a system bus comprising a 16-bit data bus 2, an address bus 3 and a control bus 4. Each of the buses 2, 3, 4 has a number of conductors for transferring binary data among the circuit elements.

The engine control system also includes a read only memory (ROM) 7 which stores both instructions for execution by the uP 5 and empirically derived look-up tables for ignition timing control. A random access memory (RAM) 6 is used generally to store program data.

A number of ignition drivers 8, represented by a single block, control current through respective ignition coils (not shown) for firing the spark plugs (not shown) at the proper crankshaft position in the engine cycle in accordance with signals provided by the engine control integrated circuit 1. In a similar manner, fuel injection drivers 9 and valve drivers 10 control current flow to the fuel injectors (not shown) and to the intake and exhaust valves (not shown), thereby controlling fuel dispensing and valve timing.

Crankshaft and camshaft sensor signals are coupled to the engine control integrated circuit 1 for calculating real time crankshaft position, engine speed and acceleration. The integrated circuit 1 also receives a number of analog sensor inputs, for example, manifold absolute pressure (indicating engine load), battery voltage and mass airflow, for use in ignition timing and fuel injection control.

In controlling ignition timing, for example, the microprocessor 5 reads the current engine speed and load from registers in the engine control integrated circuit 1 to obtain the desired spark firing angle from the ignition timing map stored in the ROM 7. The microprocessor 5 then converts the desired spark firing angle to an absolute crankshaft position which is written to the engine control integrated circuit for controlling the ignition drivers 8 and ultimately the spark events.

FIG. 2 illustrates a block diagram of the engine control integrated circuit 1 which includes a Position, Velocity and Acceleration module (PVAM) 14, an Ignition Channels Control Module 18, a plurality of Ignition Channels 19, a plurality of fuel Injector Channels 20, a plurality of Valve Channels 21, an Address Decode Logic (ADL) circuit 11, a Data Acquisition Module 22 and an Interrupt Module 23.

Crankshaft and camshaft sensor signals 12, 13 are coupled to the Position, Velocity and Acceleration module (PVAM) 14 which calculates real time or current crankshaft position for output over a 13-bit Real Time Position Bus 15. The PVAM 14 also calculates velocity and acceleration of the crankshaft for output over a 16-bit velocity bus 16 and a 16-bit acceleration bus 17. The Real Time Position Bus 15 has a resolution of 0.1 degrees, in the preferred embodiment, and the value of the Bus ranges from 0 to 7199 representing engine angular position in tenths of degrees through two revolutions of the engine as required for ignition in all cylinders of a four cycle engine.

The real time crankshaft position signals are output over the Real Time Position Bus 15 to the Ignition channels 19, to the Injectors Channels 20 and to the Valve Channels 21 for comparison with desired ignition advance position and desired fuel injection/valve start and stop crankshaft positions, all of which are written to the channels by the uP 5 over the data bus 2.

The Ignition Channels Control Module 18 converts dwell time to a dwell-on position which is written to a selected Ignition Channel 19 for ignition timing purposes. The selected Ignition Channel 19 compares the stored dwell-on position and ignition advance position with the real time crankshaft position provided over the Real Time Position Bus 15 to start and stop current flow in the ignition driver.

The fuel Injector Channels 20 and the Valve Channels 21 function in a similar manner to the Ignition Channels 19 except that the fuel injector/valve on position is programmed directly by the uP 5 as no calculations are required to determine the respective on positions as in the case of dwell control. It should be obvious, however, that an initial on position could be used in conjunction with an on time and, similar to that of an Ignition Channel, the on time could be converted to a position value given velocity and acceleration.

The Address Decode Logic (ADL) circuit 11 is connected to the address bus 3 and to the control bus 4 for decoding address and control data transmitted by the uP 5 over the respective buses 3, 4. During microprocessor read operations, the ADL 11 decodes the control and address bus signals and activates a single register select line which enables a set of three-state drivers for driving the contents of the addressed register onto the data bus. Likewise, during a microprocessor write operation, the ADL 11 decodes the control and address bus and in turn activates a single line for loading the addressed register with the data contained on the data bus.

The Data Acquisition Module 22 is designed to convert various analog signals, such as manifold absolute pressure and battery voltage, to digital signals when the crankshaft has rotated to predetermined engine positions which are programmed by the uP 5 over the data bus 2. The Data Acquisition Module 22 compares the programmed engine position at which analog-to-digital conversion is to take place with the current crankshaft position, as provided on the Real Time Position Bus 15, to initiate the conversion when there is agreement between the programmed position and the current crankshaft position. The digital value is then stored in a register of the Data Acquisition Module 22.

The Interrupt Module 23 monitors changes in engine position, velocity and acceleration, and sends an interrupt signal to the uP 5 which then takes action based on the type of interrupt. For example, if the change in velocity has exceeded a predetermined amount then an interrupt is generated that causes the uP 5 to perform a new table lookup for determining a new ignition advance angle.

Referring to FIG. 3, the Position, Velocity and Acceleration Module (PVAM) 14 is described. The primary functions of the PVAM 14 are to compute an absolute real time position of the crankshaft for output over the Real Time Position Bus 15 and to compute engine velocity and acceleration for output over the velocity bus 16 and the acceleration bus 17. The Real Time Position Bus 15 actually reflects a tracked engine position having a resolution derived from a coarse grain position sensor signal and a fine grain extrapolated position between sensor signals. The coarse grain position is calculated in response to sensing equally spaced teeth or markers around the periphery of a disk which is attached to the crankshaft. The present invention also contemplates counting markers other than crankshaft markers, such as, equally spaced teeth on the engine flywheel which rotates in unison with the crankshaft. A sensor and associated signal processing circuitry produces a uniform crankshaft pulse having a rising and falling edge (FIG. 5) for each detected marker. If the markers are spaced 1° apart, then crankshaft pulses are produced at uniformly spaced crankshaft positions, i.e., every 1°, as the crankshaft rotates. In the preferred embodiment of the invention, the fine grain extrapolated position has a resolution of 0.1°, which is referred to as a "tick." For example, a binary value equating to 73 on the Real Time Position Bus 15 is an absolute crankshaft position of 7.3° with respect to a 0° engine reference position. 7.3° represents passage of 7 crankshaft pulses since the 0° reference, and 0.3° is the extrapolated position between the 7th and 8th crankshaft pulses.

Before engine cranking begins, a Degrees Per Crankshaft Pulse (DPCP) register 24 is initialized or programmed by the uP 5 with a predetermined number of incremental crankshaft positions between contiguous markers, e.g., the number of degrees between crankshaft pulses in tenths of degrees. The DPCP register 24 is loaded in response to a signal 25 from the ADL 11. Each of the registers used in the PVAM 14 includes a plurality of flip-flops which store the binary data and continuously output the stored value on the Q outputs of the flip-flops. Thus, the DPCP register 24 stores and outputs over a bus 71 the predetermined number of incremental crankshaft positions between adjacent crankshaft markers.

Engine tracking is performed by a Position Adder circuit 27 which adds the value stored in the DPCP register 24 and a current coarse grain crankshaft position (stored in a register in circuit 27) upon each new arrival of a crankshaft pulse 12 to produce an updated coarse grain position of the crankshaft. In the example, there is 1° between crankshaft pulses, then the DPCP register 24 stores the binary equivalent of 10, i.e., 10 tenths of a degree between crankshaft pulses. For each new crankshaft pulse, the value 10 is added to the current coarse grain crankshaft position, for example 70 (representing 7.0°), thereby producing a new coarse grain crankshaft position of 80 or 8.0°.

Position extrapolation between crankshaft pulses is performed by an Arithmetic Unit (AU) 28 which first computes the number of system clocks (equivalent to an amount of time) for the crankshaft to rotate to the first incremental position immediately following the arrival of a new crankshaft pulse 12. The number of clocks or time for the first position tick (CFT) is output from the AU 28 on a bus 29 to a Clocks Per Tick Accumulator (CPTA) 30. The CPTA 30 subtracts the number of system clocks required by the AU 28 to calculate the first tick and passes the resulting value on a bus 31 to a Down Counter 32. The Down Counter 32 in turn counts down to zero the adjusted number of system clocks for the first position tick and issues a tick signal 33 to a Fine Grain Position (FGP) circuit 34. The tick signal 33 increments a counter in the FGP circuit 34 to produce a fine grain position which is fed over a Fine Grain Bus 35 to the Position Adder 27. The Position Adder 27 sums the coarse grain position with the fine grain position to produce an absolute crankshaft position over the Real Time Position Bus 15. With reference also to FIG. 4, assuming the Real Time Position Bus 15 shows an absolute crankshaft position of 70 (7.0°) after just counting a crankshaft pulse 12, then position extrapolation in tenths of degrees occurs until the next detected crankshaft marker. The Down Counter 32 outputs the first tick which increments the FGP circuit 34 to pass a 1 tick value (0.1°) over the Fine Grain Bus 35 to the Position Adder 27 which adds 1 to 70 to produce a crankshaft position of 71 (7.1°) over the Real Time Position Bus 15.

In addition to computing the number of clocks for the first tick position (CFT), the AU 28 also computes a change in time between each incremental position of the crankshaft as the crankshaft rotates to the next marker, referred to as the delta number of clocks per tick (DT). Both CFT and DT are used to accurately predict incremental positions between crankshaft pulses in the presence of acceleration or deceleration of the engine as will be described later.

Again with reference to FIG. 3, the delta number of clocks per tick (DT) is output from the AU 28 on a bus 36 to the CPTA 30. After extrapolation of the first tick (0.1°), the CPTA 30 adds the delta number of clocks per tick (DT) to the number of clocks for the first tick (CFT) to produce the number of system clocks for the second extrapolated tick. The Down Counter is loaded with the number of system clocks for the second extrapolated tick and again counts down to zero to produce a second tick signal 33 which increments the counter in the FGP circuit 34. Following which, in the preferred embodiment, a 2 (0.2°) is output over the Fine Grain Bus 35 to the Position Adder 27 for addition to the coarse grain bus 37. With reference also to FIG. 4, the time for the second extrapolated tick is CFT-DT which is counted down to produce the 0.2° extrapolated fine grain position on the Fine Grain Bus 35.

For each of the remaining position ticks, the delta number of clocks per tick (DT) is added to the number of clocks for the immediately preceding tick position and the sum is loaded in the Down Counter 32 over the bus 31. The Down Counter 32 repetitively counts down to zero after each load to produce a series of tick signals 33 for incrementing the counter in the FGP circuit 34. When the next crankshaft pulse arrives, the AU 28 computes a new CFT and DT, and the position extrapolation repeats. FIG. 4 illustrates an acceleration condition as the times for the position ticks become progressively shorter proceeding from a real time position of 7.0° to 8.0°.

Now with reference to FIG. 6, a detailed description of the AU 28 follows. Several computations are performed by the AU 28 including:

1. Number of clocks for the first extrapolated 0.1 degree tick (CFT).

2. Delta clocks (DT) per extrapolated 0.1 degree tick.

3. Initial velocity (v) at the beginning of a new marker interval.

4. Average acceleration (a) over the last marker interval.

All the computations revolve around the number of clocks 38 that occurs during a crankshaft pulse interval, i.e., the time between crankshaft pulses. The current invention uses a clock source with a frequency of 16,777,200 clocks/sec. Not deviating from the spirit of the invention, other clock frequencies could be used by simply adjusting the constant values described later.

A Pulse Duration Timer (PDT) 39 counts the system clocks 38 between crankshaft pulses 12 to measure the time between crankshaft pulses. FIG. 7 illustrates a schematic diagram of the PDT 39. A 22-bit Pulse Duration Counter 40 is incremented with each system clock 38 and the incremented value is output over a bus 41. Upon receiving the rising edge of a new crankshaft pulse 12, a state machine 42 (FIG. 3) of the PVAM 14 issues a clear count signal 43 which first loads a Pulse Duration Register (PDR) 44 with the contents of the bus 41 and at the same time transfers the contents of the Pulse Duration Register (PDR) 44 over a bus 45 to a Last Pulse Duration Register (LPDR) 46.

Each of the state machines used in the PVAM 14 is a conventional digital state machine described by reference to the respective state diagrams. For example, the rising edge of the crankshaft pulse (and FGPDONE=1) causes the PVAM state machine to transition from state A to state E as shown in FIG. 14. In state E, the PVAM state machine asserts the clear count signal 43.

The loading of both registers 44, 46 occurs on the rising edge of the clear count signal 43 which is provided also to the 22-bit Pulse Duration Counter 40 as an asynchronous reset signal that clears the Counter 40 back to zero in preparation for counting the system clocks of the next crankshaft pulse interval. Thus, the PDR 44 stores and outputs over the bus 45 the number of clocks or time for the most recent crankshaft pulse interval whereas the LPDR 46 stores and outputs over a bus 57 the time for the previous crankshaft pulse interval.

The other function of the Pulse Duration Timer 39 is to detect a minimum RPM condition. This is done to prevent the 22-bit Counter 40 from overflowing at an extremely low RPM. During initialization, a minimum RPM register 47 is loaded by the uP 5 with the number of clocks that will occur at the minimum RPM. The number of clocks at the minimum RPM of 30 RPM=(DPCP)/1800÷$\frac{1}{2}^{24}$ for a system clock of 16,777,200 clocks/sec. The ADL 11 drives either signal 48 or 49 to load the 22-bit register 47 depending on whether the least significant 16 bits or most significant 6 bits are to be loaded respectively from the uP 16-bit data bus 2. The contents of the minimum RPM register 47 are output on a bus 50 to a comparator 51 which issues a control signal 190 to freeze the 22-bit Counter 40 with a NOR gate 52 whenever the Counter 40 reaches the programmed minimum RPM clock count.

The AU 28, FIG. 6, also includes a Delta Pulse Duration Timer 53 which calculates the difference in time both between the previous two crankshaft pulse intervals and between the next previous two crankshaft pulse intervals. With reference to FIG. 8, the Delta Pulse Duration Timer 53 includes a subtractor 54 which calculates the difference in time or clocks between the last two crankshaft pulse intervals by subtracting the value stored in the Pulse Duration Register 44, provided over the bus 45, from the value stored in the Last Pulse Duration Register 46 which is provided over the bus 57. (A subtractor is made up of a number of combinatorial gates producing the difference between the two input bus values and continuously outputting the difference value.) The resulting difference is output over a bus 58 and stored in a Delta Pulse Duration Register (DPDR) 55. An AU state machine 66 (FIG. 6) provides a positive edge clock signal 56 for loading both the DPDR 55 and a Last Delta Pulse Duration Register (LDPDR) 59. At the same time the Delta Pulse Duration Register (DPDR) 55 is loaded by the signal 56, the contents of the DPDR 55 are also loaded by the signal 56 into the Last Delta Pulse Duration Register (LDPDR) 59 over a bus 60. Thus, the DPDR 55 stores and outputs over the bus 60 the difference in time between the last two crankshaft pulse intervals, and the LDPDR 59 stores and outputs over a bus 77 the difference in time between the previous two crankshaft pulse intervals.

Given the number of clocks for the last crankshaft pulse interval stored in the Pulse Duration Register (PDR) 44, the number of clocks in the previous crankshaft pulse interval stored in the Last Pulse Duration Register (LPDR) 46, the difference between the last two crankshaft pulse intervals stored in the Delta Pulse Duration Register (DPDR) 55, and finally the difference between the previous two crankshaft pulse intervals stored in the Last Delta Pulse Duration Register (LDPDR) 59, the AU 28 is ready to carry out the four above computations associated with the PVAM 14.

Deviating slightly from the description of the digital logic, the theory behind the position extrapolation computations and their implementation follows before the mechanics of the computations are described. For a system that delivers a pulse for a fixed amount of revolution, one simply measures the time for the pulse interval, and a velocity for the rotating body can be calculated by the well-understood equation:

$$v = d/t \qquad \text{Equation 1}$$

Where:
v = average velocity
d = distance between the crankshaft pulses
t = time for the crankshaft pulse interval.

The calculated velocity is actually the average velocity over the crankshaft pulse interval, and, in fact, is the instantaneous velocity at any point during the crankshaft pulse interval under constant velocity conditions. However, during acceleration and deceleration conditions the average velocity only occurs at one instant in time and does not apply to the instantaneous velocity at all other times during the crankshaft pulse interval. The subject invention assumes that the average velocity falls directly in the middle of the crankshaft pulse interval which is a reasonable assumption for crankshaft pulses not exceeding 45° apart and engine speeds above a few hundred RPM. Given the assumption that the average velocity falls at the center of the crankshaft pulse interval and with the understanding that velocity is a linear function with respect to time under constant acceleration or deceleration, the initial velocity at the beginning of a new crankshaft pulse interval can be computed as a function of the elapsed time over two previous crankshaft pulse intervals. The inverse of the initial velocity can then be used to compute the time (clocks) for the crankshaft to rotate to the first incremental position, i.e., 0.1°, following detection of a crankshaft marker according to the following equation:

$$CFT = \frac{PDR - DPDR/2}{DPCP} \qquad \text{Equation 2}$$

Where:
CFT = system clocks for the first extrapolated incremental position of, e.g., 0.1°
PDR = Pulse Duration Register value
DPDR = Delta Pulse Duration Register value
DPCP = Degrees Per Crankshaft Pulse register value.

The term PDR/DPCP represents an average amount of time for the crankshaft to rotate through each 0.1° incremental position during the previous crankshaft pulse interval. The term DPDR/DPCP provides a correction for past acceleration or deceleration of the crankshaft. Dividing DPDR by 2 has the effect of transforming the average-based time measurement to a time measurement occurring at the beginning of the crankshaft pulse interval.

The delta number of clocks per incremental tick (DT) can be computed from the following equation:

$$DT = \frac{LDPDR - 2(DPDR)}{DPCP^2} \qquad \text{Equation 3}$$

Where:
DT = delta system clocks between incremental position ticks
LDPDR = Last Delta Pulse Duration Register value
DPDR = Delta Pulse Duration Register value
DPCP = Degrees Per Crankshaft Pulse register value.

In essence, the DT equation represents a form of the inverse acceleration or change in velocity that the engine is experiencing. However, since the system is based on crankshaft pulses of a fixed distance, the equation must represent a change in time relative to a distance squared. The numerator represents the change in the number of clocks for the extrapolation marker interval while the denominator represents the distance squared. The numerator is arrived at by understanding that if the difference in time between the third prior marker interval and the second prior marker interval is known, and the difference in time between the second prior marker and the first prior marker is known, then a linear approximation can be made as to the change in clocks that will occur during the extrapolation interval. The numerator is then divided by the extrapolation interval squared with the result (DT) providing a delta number of clocks per position tick squared between extrapolated position ticks that very closely approximates the nonlinear change in distance relative to time for an accelerating body.

The initial velocity is then calculated from the inverse of CFT which was computed in Equation 2:

$$v = \frac{\text{Velocity Constant}}{CFT} \qquad \text{Equation 4}$$

Where:
v = initial velocity at the beginning of the new crankshaft pulse interval
CFT = clocks for the first extrapolated 0.1 degree tick following the new crankshaft pulse (Equation 2)

The Velocity Constant is the clock speed divided by 10 for an incremental position of 0.1°. Since the units for CFT are actually system clocks per, e.g., 0.1°, the fixed distance numerator (i.e., 0.1 degree) is scaled to reflect $2^{24}$ clocks per second for a clock frequency of 16.78 MHz. So, in this example, the Velocity Constant would be 1,677,720.

Lastly, the acceleration is computed from the well-understood equation:

$$a = \frac{v_f - v_0}{t} \qquad \text{Equation 5}$$

Where:
a = average acceleration over the previous crankshaft pulse interval
$v_f$ = velocity at the end of the previous crankshaft pulse interval
$v_0$ = initial velocity at the beginning of the previous crankshaft pulse interval t = time difference between $v_f$ and $v_o$.

The actual equation solved by the current invention for acceleration is:

$$a = \frac{v_2 - v_1}{PDR/\text{Acceleration Constant}} \quad \text{Equation 6}$$

Where:
- a = average acceleration over the previous crankshaft pulse interval
- $v_2$ = initial velocity as computed for the new crankshaft pulse interval from Equation 4 (approximately the same as $v_f$)
- $v_1$ = initial velocity as computed for the previous crankshaft pulse interval from Equation 4
- PDR = Pulse Duration Register value
- Acceleration Constant clock speed, e.g., $2^{24}$ clocks/second.

Since the denominator must be in units of time, the Pulse Duration Register value is scaled by the number of system clocks per second to arrive at the proper units of time.

Now, referring back to FIG. 6, all the computations performed by the AU 28 involve a division and thus at the heart of the AU 28 is a digital logic divider 61. The divider 61 is connected to a dividend bus 62, a divisor bus 63 and a quotient bus 64. The dividend bus 62 and divisor bus 63 are three-state buses that can be driven by several sources with only one source driving the bus at a given time to prevent any contention on the buses. The quotient bus 64 is always driven by the divider 61. The value of the quotient bus 64 is loaded into one of four registers as controlled by an AU state machine 66.

After receiving an AUGO signal 65 from the PVAM state machine 42 (FIG. 3), the first computation (i.e., clocks for first tick (CFT), equation 2) begins as controlled by the AU state machine 66. A subtractor 67 computes the dividend by subtracting the value stored in the PDR 44, which is continuously on the bus 45, from the value stored in the DPDR 55, which is continuously on the bus 60. The DPDR value is shifted one bit to the right to perform the division by 2 (i.e., DPDR/2). The resulting value from the subtractor 67 forms the dividend of the CFT computation and is output over a bus 68. The AU state machine 66 issues a control signal 70 to a set of three-state drivers, represented by a block 69, which drives the dividend from the bus 68 onto the dividend bus 62. The value stored in the DPCP register 24, as provided on the bus 71, is driven onto the divisor bus 63 by another set of three-state drivers 72 in response to a control signal 73 from the AU state machine 66. The divider 61 then computes the quotient, CFT, which is transferred over the quotient bus 64 to a CFT holding register 74. The AU state machine 66 loads the quotient, CFT, into the register 74 with a control signal 75, thus signifying the end of the first computation. Thus, the register 74 stores and continuously outputs over the bus 29 the number of system clocks or time for the first position tick, CFT, i.e., the time for the crankshaft to rotate to the first incremental position following the marker just detected.

FIG. 15 shows the state transition from state A to state B once the AU state machine 42 receives the AUGO signal. The state machine in turn issues a GO signal to an internal counter shown in FIG. 15. The counter counts down 8 clocks, i.e., the time for the divider 61 to compute the quotient, CFT, and then issues a DONE signal causing the state machine 42 to transition from state B to state C signifying the end of the CFT computation.

The second computation (i.e., delta clocks per tick (DT), equation 3) is done in a similar manner. A subtractor 76 computes the dividend by subtracting the value stored in the DPDR 55, which is continuously on the bus 60, from the value stored in the LDPDR 59, which is continuously on the bus 77, for output over a bus 78. The DPDR value is shifted 1 bit position to the left to perform the multiplication by 2 (i.e., DPDT×2). The dividend on the bus 78 is then driven onto the dividend bus 62 by another set of three-state drivers 79 in response to a control signal 80 from the AU state machine 66. The AU state machine 66 then issues the control signal 73 to the three-state drivers 72 which drive the divisor bus 63 with the DPCP value on the bus 71. The value on the quotient bus 64 is then loaded into a delta clock holding register 81 by a control signal 82 from the AU state machine 66. Since the dividend value is actually divided by the DPCP value squared, another division must be performed before the computation is complete. The AU state machine 66 drives the dividend bus 62 with the contents of the delta clock holding register 81 by enabling a set of three-state drivers, contained within the register 81, with a control signal 83. The DPCP value is still driven on the divisor bus 63 by the three-state drivers 72. The AU state machine 66 then issues another load signal 82 which loads the final divider quotient, DT, from the quotient bus 64 into the register 81, thus completing the second computation. Thus, the register 81 stores and continuously outputs over the bus 36 the delta number of clocks for each tick, DT, i.e., the change in time between each incremental position of the rotating crankshaft as the crankshaft rotates from the marker just detected to the next marker.

The third computation (i.e., initial velocity, equation 4) is then performed by the AU 28. A Velocity Constant circuit 84 is hardwired with the velocity constant, the value of which is determined as described above. The AU state machine 66 sends a control signal 85 to the Velocity Constant circuit 84 causing a set of three-state drivers within the circuit 84 to output the stored velocity constant onto the dividend bus 62. The divisor bus 63 is driven with the value, CFT, by a set of three-state drivers contained within the CFT holding register 74 in response to a control signal 86 from the AU state machine 66. The AU state machine 66 then issues a signal 89 to load the quotient, i.e., initial velocity, from the quotient bus 64 into a velocity register (register 87) contained within a Velocity Logic circuit 88. This completes the initial velocity computation. The initial velocity at the beginning of the current crankshaft pulse interval is then continuously available on the velocity bus 16.

For the final computation (i.e., acceleration, equation 6) delta velocity information is required. With reference to FIG. 9, the Velocity Logic circuit 88 is first described. At the same time as the AU state machine 66 loads the velocity register 87 with the initial velocity of the current crankshaft pulse interval, the load signal 89 transfers the contents of the velocity register 87 over the velocity bus 16 into a last velocity register 90.

Thus, the velocity register 87 stores and outputs over the bus 16 the initial velocity of the crankshaft at the beginning of the marker interval for the marker just detected. The last velocity register stores and outputs over a bus 94 the initial velocity of the crankshaft at the beginning of the previous marker interval. A subtractor 92 then computes a velocity difference by subtracting the last velocity register value, provided over the last velocity bus 94, from the velocity register value, provided over the velocity bus 16. The velocity difference is output over a signed delta velocity bus 93. A logic block 95 takes the absolute value of the signed delta velocity bus 93 by observing a signal 91 (the most significant bit of the velocity difference value) to produce a positive delta velocity for output over a delta velocity bus 96. An acceleration dividend circuit 104 is another set of three-state drivers for outputting the positive delta velocity onto the dividend bus 62 as described below. The uP 5 may read the contents of the velocity register 87 over the data bus 2 when the ADL 11 asserts a control signal 97.

The acceleration computation then begins by first computing the divisor, i.e., PDR/Acceleration Constant. With reference again to FIG. 6, the AU state machine 66 issues a control signal 99 to another set of three-state drivers 98 causing the Pulse Duration Register value, which is continuously on the bus 45, to be driven onto the dividend bus 62. The acceleration constant, which is stored in a hardwired circuit 100, is output onto the divisor bus 63 by a set of three-state drivers in the circuit 100 in response to a signal 101 from the AU state machine 66. The divider 61 computes a temporary quotient over the quotient bus 64 that is loaded into an Acceleration Logic circuit 250.

FIG. 10 illustrates the Acceleration Logic circuit 250. The temporary quotient is loaded into a temporary register 102 with a control signal 103 from the AU state machine 66. The second half of the computation proceeds with the AU state machine 66 issuing a control signal 105 to the three-state drivers of the acceleration dividend circuit 104 (FIG. 9) for driving the positive delta velocity from the delta velocity bus 96 onto the dividend bus 62. The temporary divisor quotient, stored in the temporary register 102, is driven onto the divisor bus 63 when a set of three-state drivers within the temporary register 102 receives a control signal 107 from the AU state machine 66. The divider 61 (FIG. 6) then computes an average acceleration quotient which is sent over the quotient bus 64. The quotient, average acceleration over the past crankshaft pulse interval, is then loaded into an acceleration register 108 of the Acceleration Logic circuit 250 in response to a control signal 109 from the state machine 66. The uP 5 can read the acceleration register 108 when the ADL 11 asserts a signal 110 which enables a set of three-state drivers within the acceleration register 108 to drive the data bus 2. The acceleration register 108 continuously outputs over the acceleration bus 17 the average acceleration of the crankshaft over the marker interval preceding the marker just detected.

The velocity bus 16 and the acceleration bus 17 leave the PVAM 14 and are used by other modules within the engine control integrated circuit 1. The first two computed values, namely, CFT and DT, are, however, used only by the PVAM 14 to perform position extrapolation as follows.

As shown in FIG. 3, the number of system clocks for the first extrapolated tick (CFT) and the Delta Clocks Per Tick (DT) are fed from the AU 28 to the Clocks Per Tick Accumulator (CPTA) 30 over the respective buses 29 and 36. The CPTA 30 calculates and outputs over the bus 31 the number of clocks (time) for the crankshaft to rotate to each one of the incremental positions following the first incremental position/tick. The CPTA 30 also outputs the time for the crankshaft to rotate to the first incremental position.

The CPTA 30 is shown in FIG. 11 and includes an adder 119, a register 113 having a plurality of D-type flip-flops and a first tick adjust and rounder circuit 117. The PVAM state machine 42 (FIG. 3), upon receiving the rising edge of a crankshaft pulse 12, issues a select signal 112 which multiplexes the CFT bus 29 to the D inputs of the flip-flops contained within the register 113. A clock signal 114 (normally active low) is then asserted by the PVAM state machine 42 causing the register 113 to be loaded with the number of clocks for the first tick (CFT) provided over the CFT bus 29. The select signal 112 is then deasserted allowing the output result of the adder 19 to be applied over an adder bus 115 to the D inputs of the flip-flops within the register 113. The output of the adder 119 is not loaded in the register 113 until the next clock signal 114. An adjust signal 116 is then asserted to the first tick adjust and rounder circuit 117 which subtracts off the number of clocks, i.e., 24, that are required to compute CFT and DT. When the adjust signal 116 is deasserted, an adder within the circuit 117 rounds up a 15-bit bus input value to a 14-bit bus output value. The adjust circuit 117 continuously drives the bus 31 with an adjusted number of clocks for the first tick or with a rounded number of clocks for each subsequent incremental position tick depending upon whether or not the adjust signal 116 is asserted.

The Down Counter 32 (FIG. 3) is then loaded with the adjusted value of the CFT from the bus 31 by a PVAM state machine signal 118. The signal 118 is issued by the PVAM state machine 42 after receiving a signal 275 from the AU state machine 66 signifying that the computations of CFT and DT have been completed. Once the Down Counter 32 has been loaded, the adjust signal 116 is deasserted allowing the circuit 117 to output a rounded result for each subsequent position tick. The number of clocks for the second position tick is calculated by the adder 119 which sums the CFT value stored in the register 113, and provided over a bus 180, with the delta number of clocks per tick, provided over the DT bus 36, and outputs the sum over the adder bus 115. The PVAM state machine 42 then asserts the clock signal 114 causing the register 113 to be loaded from the adder bus 115 with the number of system clocks for the second tick. Subsequent number of clocks per tick are loaded into the register 113 when the Down Counter 32 reaches the zero count and issues a signal 240 (normally active high) to the CPTA 30. Either signal 114 or signal 240 causes a load of the register 113 via an AND gate 241. The CPTA calculations continue for all the extrapolated position ticks until a new crankshaft pulse arrives.

Each incremental position clock value is fed from the CPTA 30 over the bus 31 to the Down Counter 32 (FIG. 3) which uses the system clock 38 for down counting to zero the incremental position clock value. At each zero count value the Down Counter 32 generates a tick signal 33. Circuitry within the Down Counter 32 detects the zero count value and generates an internal load signal (the inverse of signal 240) to reload the Down Counter 32 with the clock value on the bus 31. So, the Down Counter 32 outputs a series of tick signals 33 between contiguous markers, and the spacing between adjacent tick signals varies in accordance with prior acceleration or deceleration of the crankshaft.

An asynchronous reset signal 120 is used to reset the Down Counter 32 at initialization time. An enable count signal 121 is provided by the PVAM state machine 42 to stop the Down Counter 32 during a stall condition which is described below.

Now with reference to FIG. 12, the Fine Grain Position circuit 34 includes a Fine Grain Position Counter (FGPC) 122 and a stall/burst logic circuit 124. When the Down Counter 32 counts down to zero, the tick signal 33 is issued to the Fine Grain Position Counter (FGPC) 122 which counts each of the tick signals and continuously drives the Fine Grain Position Bus 35 with the count value of the FGPC 122. When the PVAM state machine 42 detects the rising edge of a crankshaft pulse 12, the FGPC 122 is reset by an asynchronous clear signal 123. In the preferred embodiment, the FGPC 122 counts the extrapolated 0.1° position ticks between crankshaft pulses. If there is a non-constant acceleration or deceleration condition, the stall/burst logic circuit 124 detects such a condition and maintains the integrity of the Fine Grain Position Bus 35 by never skipping or double counting position ticks. The circuit 124 does this by comparing the value stored in the DPCP register 24, which is provided on the bus 71, with the current value on the Fine Grain Position Bus 35. If the Fine Grain Position Bus 35 reaches the DPCP value minus 0.1°, a signal 125 is asserted to the PVAM state machine 42 which stops the Down Counter 32 (FIG. 3) with the enable count signal 121. A signal 195 is also asserted by the circuit 124 to stop the FGPC 122. This prevents double counting beyond the value of the DPCP register value as would occur under a non-constant deceleration condition. Likewise, under a non-constant acceleration condition, the PVAM state machine 42 will receive a new crankshaft pulse 12 before the Fine Grain Position Bus 35 reaches its end value (i.e., DPCP minus 0.1°). In this case, the PVAM state machine 42 asserts a signal 126 which allows the system clock 38 to be multiplexed to the clocking signal input of the FGPC 122. The FGPC 122 is then bursted ahead until the circuit 124 detects that the DPCP value minus 0.1° has been reached. The bursting logic assures that all position ticks are counted, thereby maintaining the integrity of the Fine Grain Position Bus 35 and, hence, the Real Time Position Bus 15.

With reference to FIG. 3, the Fine Grain Position Circuit 34 outputs a fine grain position digital value over the Fine Grain Position Bus 35 to the Position Adder 27 which adds the fine grain position to the coarse grain position to produce a current absolute crankshaft position for output over the Real Time Position Bus 15.

FIG. 13 illustrates the Position Adder 27 which includes an adder 182 and a coarse grain position register 129 for calculating and outputting over a bus 37 the coarse grain position of the crankshaft. Before describing the Position Adder 27 in detail, the initialization of the Position Adder 27 and sychronization of timing events are first described below.

With reference to FIG. 3, the PVAM state machine 42 and a Lock state machine 127 exchange two signals for synchronizing events. At initialization, the PVAM state machine 42 receives the reset signal 120 and waits until three consecutive crankshaft pulses 12 have been detected as shown by a set of three flip-flops in FIG. 14. The PDT 39 (FIG. 7) registers and the DPDT 53 (FIG. 8) registers will have been loaded at this time. The PVAM state machine 42 then sends a signal 200 to the Lock state machine 127 indicating that a transition on the camshaft signal 13 (FIG. 5) can now be used to initialize the coarse grain position register 129 of the Position Adder 27 (FIG. 13) with a crankshaft reference position. In the preferred embodiment, a camshaft sensor signal is used in conjunction with the next rising edge of the crankshaft sensor signal to provide an absolute crankshaft reference position. Other techniques for providing an absolute engine reference may be used in this system without departing from the spirit of the invention.

As depicted in FIG. 16, when the Lock state machine 127 detect a rising edge (CAM=1) or falling edge (CAM=0) of the camshaft signal, the state machine transitions from state B to C or from state E to F respectively and issues a lock signal 201 back to the PVAM state machine 42 indicating a reference position lock. The multiplexer shown in FIG. 16 then outputs either 0.0° or 360.0° respectively over a bus 130 (FIG. 3). At the same time, a select signal 131 is issued by the Lock state machine 127 to the coarse grain position register 129 (FIG. 13) signifying that the lock position bus 130 is to be multiplexed to the inputs contained within the register 129. Since the PVAM state machine 42 (FIG. 3) always issues a signal 134 after detecting a rising edge of the crankshaft signal, the lock position bus 130 will be loaded into the register 129 on the next crankshaft rising edge signal. The Lock state machine 127 transitions from either state C or state F to state D after the crankshaft signal is detected at a logic high value. With reference to FIG. 13, when the crankshaft signal returns to a logic low value, the select line 131 is cleared allowing the output of the coarse grain position adder 182 to be multiplexed to the inputs of the flip-flops contained within the register 129.

As shown in FIG. 13, the coarse grain position adder 182 of the Position Adder 27 adds the coarse grain position value, output by the register 129 over the coarse grain position bus 37, and the DPCP register value (the number of tenths of degrees between crankshaft pulses), provided over the bus 71, and outputs a new coarse grain position for storage in the coarse grain position register 129. When the PVAM state machine 42 detects a rising edge of the crankshaft pulse 12, the signal 134 is asserted which loads the coarse grain position register 129 with the new coarse grain position from the adder 182 Each successive crankshaft rising edge of the crankshaft pulse 12 causes the accumulated value of the coarse grain position register 129 and the DPCP register to be loaded in the register 129 until the next rising or falling edge of the camshaft signal 13 is detected by the Lock state machine 127 as described above.

The Position Adder 27 also includes a real time position adder 181 and a real time position register 132. The real time position adder 181 adds the coarse grain position value from the coarse grain position bus 37 and the fine grain position value from the Fine Grain Position Bus 35 and outputs over a bus the real time or current absolute crankshaft position. The system clock 38 is used to load the real time position from the adder 181 into the real time position register 132. The real time position register 132 continuously outputs over the Real Time Position Bus 15 the current absolute position of the crankshaft. The uP 5 (FIG. 1) can read the real time position register 132 by having the ADL 11 (FIG. 2)

enable a set of three-state drivers within the register 132 with a signal 133, thus driving the data bus 2 With the value stored in the real time position register 132.

With the above explanation of the PVAM 14 which generates the real time position and calculated initial velocity and average acceleration, sub-modules that use the respective values are now described. FIGS. 17 and 18 illustrate a block diagram of an Ignition Channels Control Module (IGCCM) 18 and an Ignition Channel 19. The Ignition Channels Control Module (IGCCM) 18 is used to convert the dwell time, as programmed by the uP 5 in the individual Ignition Channels 19, to a dwell-on position. The IGCCM state machine 135 begins the sequence of servicing each Ignition Channel 19 after each new crankshaft pulse (i.e., new velocity and acceleration become available from the PVAM 14). The IGCCM state machine 135 signals Ignition Channel #1 to drive both its dwell time, stored in a register 144, onto a three-state dwell time bus 136 and ignition advance position, stored in a register 145, onto a three state ignition advance bus 137. The dwell-on position is then calculated, using multipliers 139, 140, 141 and summing circuits 143 and 144, according to the following equation:

$$d_{on} = d_{ia} - (V_o t + \tfrac{1}{2} a t^2) \qquad \text{Equation 6}$$

Where:
$d_{on}$ = Calculated dwell-on position
$d_{in}$ = Programmed ignition advance position
$v_o$ = Previously calculated initial velocity
$t$ = Programmed dwell time
$a$ = Previously calculated acceleration.

Upon completion of the dwell-on position calculation, the state machine 135 signals channel #1 to latch the contents of the dwell-on position on a bus 138 into a dwell-on position register 146. The state machine 135 sequences through the remaining ignition channels in the same manner.

Now, referring to FIG. 18, the operation of a single Ignition Channel 19 is described. The uP 5 programs the desired dwell time into the dwell time register 144 and the desired ignition advance point into the ignition advance register 145. As described above, the Ignition Channel Control Module 18 converts the dwell time to the dwell-on position and the resultant value is stored in the dwell-on position register 146. The Real Time Position Bus 15 is continuously compared to the dwell-on position register 146 by a comparator 147 and when they become equal, an ignition pin control logic 148 toggles an ignition output signal 149 to a logic high value thereby starting current flow in the ignition drivers. The pin remains at a logic high until the Real Time Position Bus 15 reaches the ignition advance position register 145, as measured by a comparator 150, at which time the ignition pin control logic 148 drives the ignition output signal 149 to a logic low level to stop current flow. In this manner, the current through the primary windings of the ignition coil can be controlled eventually resulting in a spark.

Now referring to FIG. 19 which applies equally as well to an Injector or Valve Channel, the Real Time Position Bus 15 is compared to an ON position register 151, programmed by the uP 5, for signaling fuel injection to start. A comparator 152 provides a signal to a pin control logic 153 when the Real Time Position Bus 15 is equal to the ON position register 151. The pin control logic 153 toggles an output signal 156 to a logic high level for starting current to the fuel injector. Likewise, when the Real Time Position Bus 15 equals an OFF position register 154, a comparator 155 signals the pin control logic 153 to return the output signal 156 to a logic low level to stop current flow. Since the Real Time Position Bus 15 reflects the current angular position of the engine, the ON and OFF position registers are written directly with the desired ON and OFF position in tenths of degrees.

With reference to FIG. 20, the Interrupt Module 23 provides several methods for generating interrupts to the uP 5. Generally, during engine start up, sufficiently long dwell times that insure a proper spark and sufficiently long fuel injection times are programmed into the current device to insure combustion within the cylinders. Once a predetermined velocity has been reached, normal control of dwell times, ignition advance positions, fuel injection on and off positions and valve timings are done via the table look ups. The Interrupt Module 23 allows an initial velocity interrupt register 157 to be programmed by the uP 5 for the above described purpose. A comparator within 157 compares the velocity bus 16 with the value programmed within 157 and generates an interrupt to the uP 5 when the two values become equal. The delta velocity interrupt register 158 compares velocity difference between the last crankshaft pulses to a programmed value and generates an interrupt to the uP 5 if the value is exceeded. The delta acceleration interrupt register 159 works identical to 158 except that acceleration instead of velocity is used for the comparison. The position interrupt register logic 160 compares uP 5 programmed position value to the Real Time Position Bus 15 and if a match occurs an interrupt is generated to the uP 5.

FIG. 21 illustrates the Data Acquisition Module (DAQM) 22. The DAQM 22 converts analog signals to digital signals based on programmable position values. The uP 5 programs a plurality of sample point registers 161 both with the respective angular engine positions at which the data conversion is to take place and with the analog channel, as selected by an analog multiplexer 162, to use for the conversion. Whenever a match between the sample point registers 161 and the Real Time Position Bus 15 occurs as determined by a comparator 163, a start conversion signal 162 signals an A/D converter 164 to start the acquisition. Upon completion of the conversion, a digital output data bus 165 from the A/D converter 164 is loaded into a sampled data register 166 corresponding to the respective sample point register. The uP 5 is then free to read the digitally converted analog signals via the uP data bus 2 as controlled by the ADL 11.

While the extrapolation system has been described in terms of indicating and predicting the position of a crankshaft of an internal combustion engine, it should be apparent that the present extrapolation system may be used for indicating and predicting the position of any rotating member.

Many details of the type which would be obvious to one skilled in this art have not been rigorously described in the interest of more clearly illustrating and describing those elements which are relevant to the present invention. For example, every state machine transition as depicted in FIGS. 14, 15 and 16 has not been described as well as some of the logic circuitry contained within some of the circuit blocks. However, any omitted details would be known to those of ordinary skill in this art, and the drawings and descriptions provided herein would make it obvious to those of such skill to make and use the invention without undue experimentation.

It is expressly intended that the foregoing description is illustrative of a preferred embodiment only, not limiting, and that the true spirit and scope of the present invention be determined by reference to the appended claims.

I claim:

1. In a system for indicating the position of a rotating member with respect to a reference position, wherein the member has a plurality of markers spaced at substantially equal angles about the member, the markers defining a plurality of marker intervals, sensor means for generating a pulse signal in response to detection of each of the markers, a position extrapolation circuit for predicting the time for the rotating member to rotate to each of a predetermined number of incremental positions between contiguous markers comprising:
    (a) means responsive to the pulse signals for measuring the time for the rotating member to rotate through each of first and second marker intervals, wherein the first marker interval ends with the marker just detected and begins with the preceding marker, and the second marker interval precedes the first marker interval;
    (b) a first register for storing and outputting the time, (PDR), for the rotating member to rotate through the first marker interval;
    (c) a subtractor for calculating the difference in time, (DPDR), between the first marker interval and the second marker interval;
    (d) a second register for storing and outputting the difference in time, (DPDR), between the first marker interval and the second marker interval;
    (e) first means for storing and outputting a number, (DPCP), equal to the predetermined number of incremental positions between contiguous markers; and
    (f) means responsive to the output of said first storage means and to the outputs of said first and second registers for computing the time for the rotating member to rotate to a first incremental position following the marker just detected according to the following formula:

$$\frac{PDR - DPDR/2}{DPCP}.$$

2. The circuit, as defined in claim 1, wherein said time measuring means measures the time for the rotating member to rotate through a third marker interval, the third marker interval preceding the second marker interval, said subtractor calculates a previous difference in time, (LDPDR), between the second marker interval and the third marker interval, and further comprising a third register for storing and outputting the previous difference in time, (LDPDR), wherein said computing means responsive to the output of said third register computes a change in time between each incremental position of the rotating member according to the formula:

$$\frac{LDPDR - 2(DPDR)}{DPCP^2}.$$

3. The circuit, as defined in claim 2, further comprising a fourth register for storing and outputting the time for the rotating member to rotate to the first incremental position, (CFT).

4. The circuit, as defined in claim 3, further comprising a fifth register for storing and outputting the change in time between each incremental position of the rotating member.

5. The circuit, as defined in claim 4, further comprising first means responsive to the outputs of said fourth and fifth registers for calculating and outputting the time for the rotating member to rotate to each one of the incremental positions following the first incremental position and for outputting the time for the rotating member to rotate to the first incremental position.

6. The circuit, as defined in claim 5, further comprising a first counter responsive to the output of said first calculating means for counting down to zero the time for the first incremental position, said first counter outputting a tick signal at the zero count value, said first counter further counting down to zero the time for each one of the incremental positions following the first incremental position and outputting a tick signal at each zero count value, whereby said first counter outputs a plurality of tick signals between the marker just detected and the next occurring marker.

7. The circuit, as defined in claim 6, further comprising a second counter for counting each of the tick signals and outputting a count value, whereby the count value of said second counter is indicative of the current incremental or fine grain position of the rotating member as the member rotates from the marker just detected to the next occurring marker.

8. The circuit, as defined in claim 7, further comprising:
    second means responsive to detection of each of the markers for calculating and outputting a coarse grain position of the rotating member; and
    an adder responsive to the outputs of said second calculating means and said second counter for adding the coarse grain position and the count value of said second counter to output a current absolute position of the rotating member.

9. The circuit, as defined in claim 8, further comprising a position register for storing the current absolute position of the rotating member.

10. The circuit, as defined in claim 9, further comprising a digital position bus for communicating the current absolute position of the rotating member.

11. The circuit, as defined in claim 3, further comprising second means for storing and outputting a Velocity Constant, wherein said computing means responsive to the outputs of said second storage means and said fourth register computes an initial velocity of the rotating member at the beginning of each marker interval according to the following formula:

$$\frac{Velocity\ Constant}{CFT}.$$

12. The circuit, as defined in claim 11, further comprising:
    a first velocity register for storing and outputting an initial velocity, ($v_1$), of the rotating member at the beginning of the first marker interval; and
    a second velocity register for storing and outputting an initial velocity, ($v_2$), of the rotating member at the beginning of the marker interval for the marker just detected.

13. The circuit, as defined in claim 12, further comprising third means for storing and outputting an Acceleration Constant, wherein said computing means responsive to the output of said third storage means and to the outputs of said first velocity and said second velocity registers computes an average acceleration of the rotating member over the first marker interval according to the following formula:

$$\frac{v_2 - v_1}{PDR/\text{Acceleration Constant}}$$

14. The circuit, as defined in claim 11, further comprising a digital velocity bus for communicating the initial velocity of the rotating member.

15. The circuit, as defined in claim 13, further comprising a digital acceleration bus for communicating the average acceleration of the rotating member.

16. The circuit, as defined in claim 1, wherein said first storage means comprises a register.

17. In a system for indicating the position of a rotating member with respect to a reference position, wherein the member has a plurality of markers spaced at substantially equal angles about the member, the markers defining a plurality of marker intervals, sensor means for generating a pulse signal in response to detection of each of the markers, a position extrapolation circuit comprising:
   (a) computing means responsive to the pulse signals for computing the initial velocity of the member at the beginning of each marker interval; and
   (b) a digital velocity bus for communicating the initial velocity of the member.

18. The circuit, as defined in claim 17, wherein said computing means computes the position of the member relative to the reference position, and further comprising a digital position bus for communicating the position of the member.

19. The circuit, as defined in claim 18, further comprising a position register for storing the position of the member communicated over said digital position bus.

20. The circuit, as defined in claim 17, further comprising a velocity register for storing the initial velocity of the member communicated over said digital velocity bus.

21. The circuit, as defined in claim 18, wherein said computing means computes an average acceleration of the member over the marker interval preceding the marker just detected, and further comprising a digital acceleration bus for communicating the average acceleration of the member.

22. The circuit, as defined in claim 21, further comprising an acceleration register for storing the average acceleration of the member communicated over said digital acceleration bus.

23. In a system for indicating the position of a rotating member with respect to a reference position, wherein the member has a plurality of markers spaced at substantially equal angles about the member, the markers defining a plurality of marker intervals, sensor means for generating a pulse signal in response to detection of each of the markers, a position extrapolation circuit comprising:
   (a) computing means responsive to the pulse signals for computing the average acceleration of the member over the marker interval preceding the marker just detected; and
   (b) a digital acceleration bus for communicating the average acceleration of the member.

24. The circuit, as defined in claim 23, wherein said computing means computes the position of the member relative to the reference position, and further comprising a digital position bus for communicating the position of the member.

* * * * *